United States Patent
Sullivan

(10) Patent No.: US 10,479,688 B2
(45) Date of Patent: Nov. 19, 2019

(54) SYSTEMS AND METHODS OF MANUFACTURING NANOTUBE STRUCTURES

(71) Applicant: Steven Sullivan, Reston, VA (US)

(72) Inventor: Steven Sullivan, Reston, VA (US)

(*) Notice: Subject to any disclaimer, the term of this patent is extended or adjusted under 35 U.S.C. 154(b) by 306 days.

(21) Appl. No.: 14/809,802

(22) Filed: Jul. 27, 2015

(65) Prior Publication Data
US 2015/0329363 A1 Nov. 19, 2015

Related U.S. Application Data

(63) Continuation of application No. 10/950,793, filed on Sep. 28, 2004, now abandoned.

(60) Provisional application No. 60/577,678, filed on Jun. 7, 2004, provisional application No. 60/565,610, filed on Apr. 27, 2004.

(51) Int. Cl.
*C01B 32/16* (2017.01)
*B82Y 30/00* (2011.01)
*B82Y 40/00* (2011.01)
*D01F 9/12* (2006.01)
*B29K 105/16* (2006.01)

(52) U.S. Cl.
CPC ............ *C01B 32/16* (2017.08); *B82Y 30/00* (2013.01); *B82Y 40/00* (2013.01); *D01F 9/12* (2013.01); *B29K 2105/162* (2013.01); *C01B 2202/34* (2013.01); *Y10T 156/1038* (2015.01); *Y10T 156/12* (2015.01); *Y10T 428/298* (2015.01); *Y10T 428/2975* (2015.01); *Y10T 428/2982* (2015.01)

(58) Field of Classification Search
CPC ..... B82Y 30/00; B82Y 40/00; C01B 31/0226; C01B 31/024; C01B 31/0246; C01B 31/0293; D01F 9/12; B29K 2105/162
USPC .................. 423/414, 445 B, 447.2
See application file for complete search history.

(56) References Cited

PUBLICATIONS

Board Decision in U.S. Appl. No. 10/950,793, dated Jan. 28, 2011.*
Board Decision in U.S. Appl. No. 10/950,793, dated Feb. 20, 2015.*
Board Decision in U.S. Appl. No. 10/950,793, dated May 29, 2015.*
Scientific Background on the Nobel Prize in Physics 2010: Graphene 4 (Class for Physics of the Royal Swedish Academy of Sciences 2010).*

(Continued)

*Primary Examiner* — George R Koch
(74) *Attorney, Agent, or Firm* — Symbus Law Group, LLC; Clifford D. Hyra

(57) ABSTRACT

A tube manufacturing system is provided that is capable of manufacturing tube structures that are on the nanoscale and larger. The system provides for control as to the structure and atomic makeup of the feed sheet material used and provides motive force to the sheet material being used to continuously advance the sheet material through the various system components. After the tube structures are formed, they may be used in providing a source material for manufacturing macroscopic objects thus increasing the level of performance and capabilities of such objects due to the engineered properties of the tube structures formed within this system and method of manufacturing. Processes for manufacturing of nanotubes are also disclosed, as are nanotubes manufactured by the processes and system of the invention.

14 Claims, 16 Drawing Sheets

(56) References Cited

PUBLICATIONS

K.S. Novoselov et al., Electric Field Effect in Atomically Thin Carbon Films, 306 Science 666 (Oct. 22, 2004).*
A.K. Geim and K.S. Novoselov, The Rise of Graphene, 6 Nature Materials 183 (2007).*
Xiaolin Li et al., Chemically Derived, Ultrasmooth Graphene Nanoribbon Semiconductors, 319 Science 1229 (2008).*
Xuesong Li et al., Large-Area Synthesis of High-Quality and Uniform Graphene Films on Copper Foils, 324 Science 1312 (2009).*
Sukang Bae et al., Roll-to-Roll Production of 30-Inch Graphene Films for Transparent Electrodes, 5 Nature Nanotechnology 574, 574 and Fig. 2c at 575 (2010).*
K.S. Novoselov et al., Two-DimensionalAtomic Crystals, 102 Proc. Nat'l. Acad. Sci. U.S.A. 10451 (2005).*
Richard Van Noorden, The Trials of New Carbon, 469 Nature 14, 15 (2011).*
The Nobel Prize in Physics 2010, http.,/nobe!p~/7_.e:o~Jn~be! prize~[physlcs/lameates/2010,mdex.html (last visited Dec. 30, 2010).*
Phaedon Avouris is an IBM Fellow and Group Leader of the Nanoscale science and technology group at the IBM T.J. Watson Research Center, Yorktown Heights, New York. ( http://www.research.ibm.com/nanoscience/group.html, last visited Jan. 25, 2011 .).*
Peer-Review Policy, http://www.nature.com/authors/editorial_policies/peer_review.html (last visited Dec. 30, 2010).*
Science: General Information for Authors, http://www.scinecemag.org/site.feature.contribinfo/prep/gen_info.xhtml (last visited Dec. 30, 2010).*

* cited by examiner

SYSTEMS AND METHODS OF MANUFACTURING NANOTUBE STRUCTURES

CROSS-REFERENCE TO RELATED APPLICATIONS

This application is a continuation of U.S. application Ser. No. 10/950,793 filed Sep. 28, 2004 now abandoned, which claims the benefit of U.S. Provisional Patent Application Ser. No. 60/577,678 filed Jun. 7, 2004, and U.S. Provisional Patent Application Ser. No. 60/565,610 filed Apr. 27, 2004, all of which are hereby incorporated herein in their entireties by reference.

BACKGROUND OF THE INVENTION

1. Field of the Invention

The present invention relates to nanotube manufacturing, and more specifically, to nanotubes and systems and methods for the formation and/or manufacture of nanotubes and nanotube structures.

2. Related Art

Carbon nanotubes are tubular carbonaceous structures with mechanical, electrical, and chemical properties that make them potentially useful in many fields, including electronic, mechanical, and medical applications. For example, they exhibit exceptional strength, primarily due to the presence of strong $sp^2$ bonds between the carbon atoms making up the tubes. Furthermore, they exhibit interesting electrical properties, such as the high conductivity of some tubes due to the alignment of carbon atoms along the long axis of the tubes. The likewise exhibit thermal properties that make them attractive for various uses, such as in heat sinks for computer chips. In addition, because they are hollow, they can hold, transport, and ultimately release substances. This property makes them quite useful for medical applications. Numerous studies are being conducted to identify other unique and useful properties of these small structures.

A nanotube is a cylindrical carbon lattice having a basic lattice structure of a fullerene. Most nanotubes are capped at one or both ends by a half fullerene molecule. Nanotubes are characterized by having external diameters of one nanometer (1 nm) to only a few (e.g., 5-10) or tens (e.g., 50) nanometers. While many nanotubes are only a few times longer than they are wide, some have been fabricated having a length of millions of times greater than their width. Nanotubes can align themselves into rope-like structures, permitting fabrication of long wires of exceptional strength, yet relatively light weight.

Nanotubes have been fabricated in two different types of basic structures: single-walled nanotubes (SWNT), and multi-walled nanotubes (MWNT). As their names imply, SWNTs are tubes having a single wall encasing an internal volume, whereas MWNTs are tubes in which a single internal volume is encased by multiple tubular wall structures arranged as nested cylinders. Due to their different structures, and due to the differences in the ease by which they can be produced, SWNTs and MWNTs are being targeted and used for different purposes (although many uses overlap).

Currently, there are various known processes and methods for the production or manufacture of carbon nanotubes. These processes can include Arc Discharge, Laser Ablation, and Chemical Vapor Deposition. In the Arc Discharge method, a carbon-containing vapor is created by an arc discharge between two carbon electrodes, and carbon nanotubes self-assemble from the vapor. Unfortunately, this method results in high levels of impurities that are expensive to remove, if at all possible. In the Laser Ablation method, a high-energy laser beam impinges on a volume of carbon-containing feedstock gas. While the nanotubes produced by Laser Ablation are cleaner than those produced by Arc Discharge, the yield is significantly lower. In the Chemical Vapor Deposition method, carbon-containing gas is exposed to heated reactive metal, which causes formation of nanotubes on the heated surface of the metal. Chemical Vapor Deposition can be used on a large scale, but often and uncontrollably produces a mixture of SWNTs and MWNTs having a wide range of diameters, the SWNTs invariably being of poor quality. Furthermore, it requires purification of the nanotubes from the soot and metals present in the reaction.

U.S. Pat. No. 6,455,021 discloses of an arc discharge method, whereby a flow of a precursor gas is exposed to a plasma discharge at very high temperatures in the production carbon nanotubes. The nanotubes generated through this protocol, however, can include a good volume of contaminants.

U.S. Pat. No. 6,331,690 discloses a laser ablation method in connection with the production of nanotubes, whereby a high-energy laser is focused at a carbon target. This method can produce nanotubes with relatively fewer contaminants than the arc discharge method, but the production rate can be low. The laser ablation method can also be capital-intensive.

U.S. Pat. No. 6,689,674 discloses of a Chemical Vapor Deposition (CVD) method for the production of nanotubes, whereby a flow of precursor gas is heated and directed over a reactive metal surface. The use of CVD in the production of carbon nanotubes can generate a good yield and relatively fewer contaminants. However, the carbon nanotubes produced can have a number of defects.

Due to the complexity of the fullerene lattice and the various ways it can be wrapped to form a cylinder or tube, nanotubes having different lattice conformations can have different physical properties. Three main classifications of nanotube lattices are uesd: zig-zag, chiral, and armchair. In general, the differences between these three classifications can be thought of as based on the orientation of a graphine sheet, before being wrapped into a tube, relative to a central axis along the tube.

These presently available nanotube-manufacturing methodologies, as noted, can result in nanotubes with a spectrum of variability in their physical properties, including number of walls, length, diameter, and lattice structure. Thus, the current technologies do not permit one to pre-select and produce only one type of nanotube, having a single wall type, length, diameter, and lattice structure or conformation. The manufacturing cost associated with such high temperature growth processes is high due to the energy cost and time required with such batch type processes.

Thus, there is a need for a reliable, consistent, controlled, and cost effective approach, so that nanotube structures may be generated within a mass production process with specificity as to length, diameter, and lattice structure, among other things.

SUMMARY OF THE INVENTION

The present invention addresses needs in the art by providing nanotubes having desirable characteristics. The invention also provides processes (referred to herein interchangeably as "methods") for producing nanotubes that are rapid, convenient, reliable, and relatively inexpensive. In addition, due to the processes of manufacturing, the nanotubes of the invention have an extremely low defect rate and are highly uniform in structure. Furthermore, the processes of the invention permit production of relatively long nanotubes of uniform structure, the length being primarily dependent on the length and quality of the graphene material used to fabricate the nanotubes. Thus, the present invention provides carbon nanotubes of relatively long length. In view of the above-described nanotubes and processes, the present invention provides systems and devices for fabrication of the nanotubes of the invention.

In general, the process of the invention comprises use of mechanical force to curve nanometer thick materials, such as graphene sheets of approximately one atom thickness, along a single axis such that a circular or, more preferably, semi-circular, structure is formed from the material. The process further comprises use of mechanical force or electromagnetic radiation to cleave the curved material at selected points or along a selected lines parallel to the line of axis along which the curve was introduced. Upon cleavage of the curved material, two edges of the curved material are present, each running parallel to the other and each running along the axis of curvature of the material. Thus, the process of the invention is a mechanosynthesis process. According to one aspect of the process, the two edges are brought into close enough proximity that they can be joined to each other along their entire length, thus forming a tubular structure, which is a nanotube. According to another aspect, two different curved and cleaved materials are brought into close proximity such that a first edge of the first curved material is in close proximity to a first edge of the second curved material, and a second edge of the first curved material is in close proximity to the second edge of the second material. The edges that are in close proximity to each other are then joined, resulting in a tubular structure, or a nanotube. In yet a third aspect, the curved materials are brought into close proximity at the points where edges will be formed, then the edges are formed in both materials at the same, or essentially the same, time. This results in the cleaved edges from both sheets being placed into close proximity to each other immediately following cleavage. The process of joining in all aspects of the process can be spontaneous or can be mediated by application of energy or mechanical force.

The processes of the invention can be applied to create essentially any length nanotube, the length being dependent primarily on the length and quality of the material being used as the nanotube material. Furthermore, because the process is controlled, at least in part, by mechanical, electromechanical, or electromagnetic means (i.e., not by chemical or biological syntheses), a high level of reproducibility and precision can be achieved, resulting in highly uniform nanotubes having pre-selected lengths, diameters, and wall structures. Thus, the present invention provides nanotubes of varying lengths, diameters, and wall structures.

In its basic form, the system of the invention generally comprises a device that applies stress to a sheet of material that is suitable for formation of nanotubes; a device that cleaves the sheet of material at one or more points or along one or more lines along the sheet; and a device that feeds and/or removes the material. In embodiments, all of these functions are supplied by a single device, while in others, two or more different devices are provided to achieve these functions. In preferred embodiments, the system further comprises one or more devices that form the cleaved material into a shape that is capable of forming a generally round or tubular shape, or that form multiple cleaved sheets into shapes that are capable of forming into an overall round or tubular shape. The system may further comprise one or more devices that align and/or feed starting material into the device(s) that impart stress and/or cleave the starting material. In addition, the system may comprise one or more devices that accept and/or transport cleaved material and/or nanotubes. In addition, the system may comprise a holder for nanotubes or nanofibers awaiting formation into nanotubes. Furthermore, the system may comprise some or all of the devices and components necessary to fabricate materials that are suitable for use as nanotube materials, such as graphite/graphene.

The system and method for manufacturing nanotube structures can be accomplished by mechanical means or mechanosynthesis process to allow for the formation or manufacture of nanotube structures with specificity and control as to length, diameter, and lattice structure, among other things. In general, the order in which several of the steps in the mechanosynthesis method of the invention can be performed may be interchanged. Thus, in the system of the invention, a particular device may be connected to certain other devices in one embodiment, whereas in other embodiments, the device may be connected to one or more other devices. Connections between the various devices can be made by any suitable mechanical connectors, the choice of which is not critical to construction of the devices and systems of the invention, or practice of the methods of the invention. In embodiments, some or all of the devices are rigidly connected to one or more other device. In embodiments, some or all of the devices are movably connected to one or more other device. The choice of the type of connection may be left to the discretion of the skilled artisan, and any suitable connections may be used.

The present invention provides, in one embodiment, a system using mechanosynthesis action for manufacturing of nanotubes. The motive action for such a process for example, may be provided by external sources of energy including chemical, thermal, acoustic, electric field and/or magnetic field and/or mechanical torque interactions, or any combination thereof.

In one embodiment, the present system incorporates the use of macroscopic rollers to enhance the ease and flexibility in motoring, braking, and other system operations during the manufacturing process. The rollers may be nanoscale or any scale in size, depending on the amount of torque capacity needed. In one such approach, rollers that are macroscopic in size with nanoscale surface features can provide for the integration across dimensional scales and on multi-functionality across various energetic domains, such as mechanics, fluidics, electromagnetics, optics, and biometric systems.

BRIEF DESCRIPTION OF THE DRAWINGS

The invention is explained in greater detail below with reference to exemplary embodiments that are illustrated in the accompanying Figures.

DETAILED DESCRIPTION OF SPECIFIC EMBODIMENTS

Figure 1A:
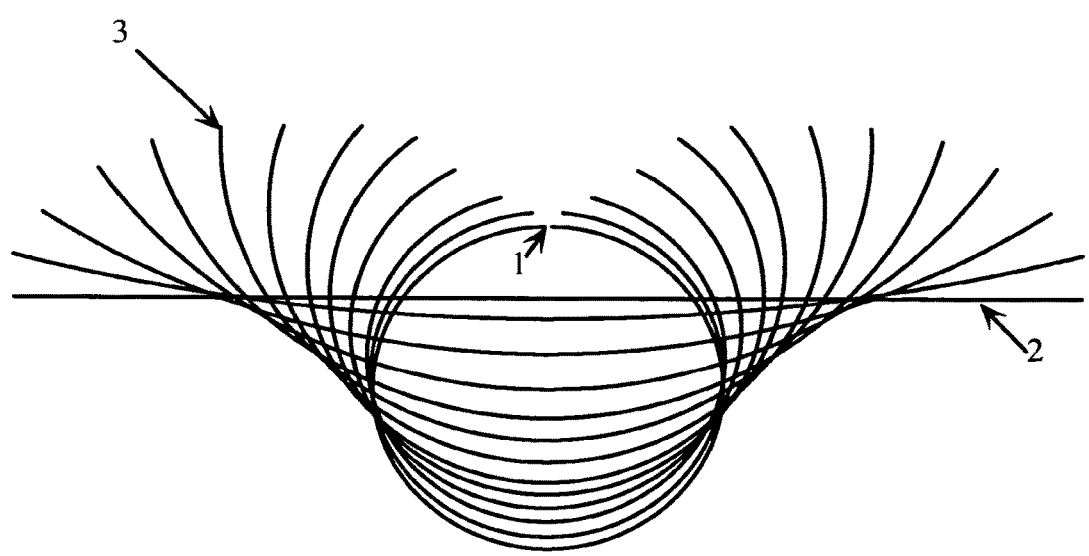
FIG. 1A is a view of a single atom thickness sheet of material that is progressively formed into a tube in accordance with the invention.

Reference will now be made in detail to various exemplary embodiments of the invention, examples of which are illustrated in the accompanying drawings. The following detailed disclosure is intended to describe in detail various embodiments of the invention, and thus should not be used to limit the scope of the appended claims, but rather to better described various embodiments of the invention as fully claimed in the claims.

Carbon nanotubes have already found use in electrically conductive materials, as semiconductor surfaces, and in transistors. Furthermore, computer memory devices, such as hard-drives, have been fabricated with nanotube components. Indeed, they have found use in such mundane items as light bulbs, serving as the filament for the bulb. However, due to the expense of production and the variability in quality, size, and conformation, their widespread use in industry has not reached a significant level. Among other things, the present invention addresses the high cost of production of nanotubes, the lack of control over the lattice conformation of nanotubes, and the lack of precise control over the diameter and length of nanotubes currently being produced.

The present invention addresses the shortcomings of the art by providing a process for the production of nanotubes. In contrast to the methods currently employed to make nanotubes, in which nanotubes are produced de novo from raw starting materials using chemical or electromagnetic techniques, the present invention utilized pre-formed graphene materials as starting materials and mechanical energy to form nanotubes having pre-defined and tightly controlled characteristics.

The process of the invention is a process of forming nanotubes, and it generally comprises providing at least one material suitable for formation into nanotubes, subjecting the material to stress to deform it, cleaving the material, forming the material into a tubular shape, and fusing the material to itself or one or two other materials to form a nanotube. Variations in the number of materials provided, the number of cleavage sites, the order in which the steps are performed, and other things, are envisioned by the method of the invention. Likewise, additional steps may be performed, depending on the final use intended for the product.

The process uses mechanical force to curve nanometer thick materials, such as graphene sheets of approximately one atom thickness, along a single axis (per nanotube to be formed) such that a generally circular structure is ultimately formed from the materials. The process further comprises use of mechanical force (e.g., a diamond knife) or electromagnetic radiation (e.g., a laser knife) to cleave the curved material along one or more selected lines parallel to the line of axis along which the curve was introduced. Upon cleavage of the curved material, two edges of the curved material are present, each running parallel to the other and each running along the axis of curvature of the material. At this point, the method can be practiced in at least two different ways to achieve a nanotube. In one way, the two edges are brought into close enough proximity that they can be joined to each other along their entire length, thus forming a tubular structure, which is a nanotube. According to another way, two different curved and cleaved materials are brought into close proximity such that a first edge of the first curved material is in close proximity to a first edge of the second curved material, and a second edge of the first curved material is in close proximity to the second edge of the second material. The edges that are in close proximity to each other are then joined, resulting in a tubular structure, or a nanotube. In yet a third aspect, the curved materials are brought into close proximity at the points where edges will be formed, then the edges are formed in both materials at the same, or essentially the same, time. This results in the cleaved edges from both sheets being placed into close proximity to each other immediately following cleavage. The process of joining in all ways of practicing the process can be spontaneous or can be mediated by application of energy or mechanical force.

The processes of the invention can be applied to create essentially any length nanotube, the length being dependent primarily on the length and quality of the material being used as the nanotube material. Furthermore, because the process is controlled, at least in part, by mechanical, electromechanical, or electromagnetic means (i.e., not by chemical or biological syntheses), a high level of reproducibility and precision can be achieved, resulting in highly uniform nanotubes having pre-selected lengths, diameters, carbon conformations, and wall structures.

More specifically, the process comprises providing at least one material to be formed into nanotube (graphene, graphene doped with metals, etc.) in the general form of a sheet having a width suitable for use in the process. That is, if a nanotube is to be created from a single piece of starting material, then the starting material should be at least as wide as the final circumference of the nanotube. On the other hand, if a nanotube is to be created from two pieces of starting material, then each piece of material should be at least one-half as wide as the final circumference of the nanotube. Likewise, if a nanotube is to be made from three, four, etc. pieces of starting material, each piece should be at least as wide as one-third, one-fourth, etc. of the final nanotube circumference. Excess starting material that is not used to form the final nanotube can be discarded as waste or used in practice of the process additional times. It can also be used in quality control assays to confirm orientation, cleavage efficiency, or any other parameter that might be of interest.

The material to be provided can be any material suitable for use in nanotubes. By far, the most prevalent material now in use for production of nanotubes is carbon, formed into structures that can be described as tubes of graphene. While the present invention contemplates use of graphene as the starting material, it also envisions the use of substituted graphene, in which one or more carbon atoms is replaced by another element, such as by a metal or rare earth metal, to provide advantageous and unique properties to the nanotube. Graphene sheets of known quality and defect rate are available, and it is envisioned that these are the most preferred starting material. Particularly preferred are graphene sheets containing few, if any, defects in lattice structure.

When graphene is used as the starting material, it can be provided to the process at any of the possible angles, with respect to the lattice structure. Thus, by adjusting the angle of provision (i.e., the angle of feed), nanotubes having different conformations (zig-zag, chiral, armchair) can be produced. Significantly, unlike other methods currently available, all nanotubes resulting from a single starting material and single practice of the processes of the present invention will have the same conformation because all will come from the same sheet of starting material, which was provided at a single, pre-defined angle. Thus, inconsistencies found in the current processes, and costs involved in obtaining pure, identical nanotubes are avoided by using the present processes.

The process also comprises subjecting the material to stress to deform the material such that it is curved about an axis along the length of the material. In embodiments, the curve is circular or substantially circular. In other embodiments, the curve is semi-circular or substantially semi-circular. In general, it is preferred that the curve, regardless of its total arc length, represent an arc that, if complete, would form a circle. Stress can be provided by any suitable means, but it is preferred that mechanical stress be used. Mechanical stress can be imparted by any suitable means, but is preferably provided by stretching of the starting material over a curved structure, such as those depicted in the Figures.

The process also comprises cleaving the material at pre-selected points or along a pre-selected line parallel to the long axis of the ultimate nanotube. Thus, in accordance with the invention, cleaving will be parallel to the axis of the tube being formed (i.e., perpendicular to the plane on which the curve is formed). In embodiments where a single piece of starting material is used, a single cleavage may be necessary. In embodiments where multiple pieces of starting material are used, multiple cleavages will likely be necessary. In addition, where multiple nanotubes are to be formed from a single piece of starting material, a single cleavage can produce edges for two separate nanotubes.

Cleavage produces at least one edge to be used to form a nanotube. Although edges can be made in batch mode (e.g., in three steps: moving a sheet into a press or cleaving device, cleaving the sheet, and moving the cleaved materials out of the device), it is preferred that a continuous process be used in which the sheet or sheets of material are fed into a device that permits cleavage at a given rate, and cleavage of the material proceeds along the sheet as it passes through a point. As can be seen in the Figures, rollers placed opposite each other can be used to accept the in-feed sheet, move it across a cleavage point, and expel cleaved (or cleaved and fused, see below) material. In many embodiments where rollers are used, the pressure exerted by the rollers causes cleavage of the material at the point of contact (or near contact) of the rollers. Likewise, other known devices for cleaving graphene sheets or the like can be used instead of mechanical rollers. For example, laser energy can be used to cleave the material as it passes along a point.

It is important to note that the deforming and cleaving can be performed in either order. Although, for the purposes of preparing multiple nanotubes from a single sheet of starting material at a single time, it is preferred to deform the starting material prior to cleavage, it is not necessary. Furthermore, it might be preferable for other purposes to cleave prior to deforming.

The process of the invention further comprises forming the cleaved material into a shape such that each of its edges are in close proximity to another edge, either from its own material or from another starting material sheet. The edges should be adjusted such that they are close enough to another edge that fusion between the two can occur, either spontaneously or through addition of energy, such as by mechanical pressure or electromagnetic radiation. As an example, if a nanotube is to be formed from two pieces, each from a separate sheet of starting material, then each of the materials would be formed into a semi-circle such that the edges of one sheet, after cleavage, would be lined up with the edges of the other sheet so that a circular shape would be presented, with two small gaps between the two sheets forming the two semi-circles. The edges should be sufficiently close to each other that they could spontaneously fuse to form a tubular structure, or fuse to form a tubular structure upon the addition of energy. It is to be understood that this same general description would hold for production of nanotubes from three or more sheets of starting material, each sheet being fused to its closest neighbors to ultimately form a tubular structure.

It is to be understood that forming of the material into a suitable shape also includes simply aligning the relevant materials with respect to each other for further processing according to the invention, if the material is already in the shape desired. Under this interpretation, if the material is already in a suitable position as a result of the feeding and cleaving steps, the forming step simply comprises maintaining the cleaved material in its proper position so that fusion may occur.

Fusing of the material at the edges to form a tubular structure results in formation of a nanotube. Fusion can be through any suitable method. However, it is preferred that the forming step be performed such that the edges to be fused are sufficiently close that the edges can, through the energy present in their own structrues, fuse spontaneously.

Of course, if the edges are not sufficiently reactive or are not in sufficient proximity, external energy, such as through mechanical force or electromagnetic radiation (e.g., laser) can be used to fuse the edges.

As can be seen from the Figures, it is envisioned that, in embodiments, multiple nanotubes will be created from a single sheet of starting material. In such embodiments, the resulting nanotubes can be used individually. Alternatively, in embodiments, the method of producing nanotubes further comprises subjecting the nanotubes to conditions, and for a sufficient amount of time, to permit the nanotubes to interact and form a rope or rope-like structure comprised of multiple individual nanotubes.

In view of the processes of the invention, the present invention provides nanotubes. The nanotubes of the invention can possess one or many properties that are advantageous for one or more uses. For example, because the process of the invention can be performed as a continuous process, it is limited only by the amount and length of starting material available. Thus, nanotubes of the invention can be many meters, or even kilometers in length. That is, the nanotubes can be anywhere from 100 nm to kilometers in length, such as about 1 micrometer, 100 micrometers, 1 mm, 100 mm, 1 cm, 10 cm, 100 cm, 1 meter, 10 meters, 100 meters, 1 km, or more than 1 km. Indeed, in embodiments, a process of making graphene sheets of known lattice geometry is linked to the process of making nanotubes, resulting in a robust system in which an essentially limitless supply of pure starting material, controlled for physical properties, is provided to the process of making nanotubes.

In addition, the nanotubes of the invention can have one or more desired properties, and one can be assured that all nanotubes from a given batch will have the same properties because of the control possible in the starting materials and in the formation of the nanotubes.

The present invention provides, in one embodiment, a system that employs mechanical means in the production of nanotube structures. For example, the system may include mechanical components, such as, casings, feed rollers, cutting rollers, and forming rollers, that when combined, form a continuous manufacturing system to permit production or manufacture of extended-length nanotubes, or nanotubes of any desired length. Moreover, the system and its components can permit the manufacturing of nanotubes that can be substantially uniform in length, diameter and lattice structure, while maintaining the cost of production at a relatively low level.

Figure 1B:
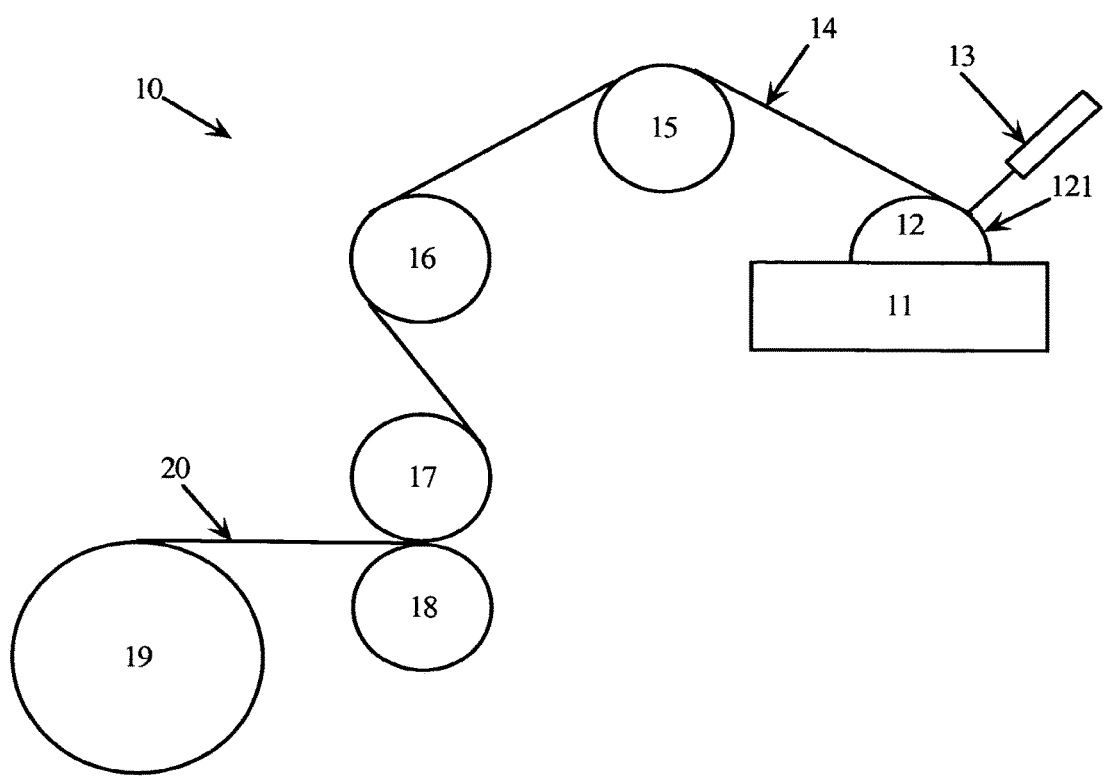
FIG. 1B illustrates an overall view of one possible system for manufacturing nanotube structures in accordance with one embodiment of the present invention.

Referring now to FIG. 1A, there is illustrated the incremental steps in the formation of a tube structure 1 from a single atoms thickness of sheet material 2 wherein 3 represents the partial formation of a tube structure that is accomplished within the cutter roller section of the manufacturing system and method of FIG. 1B.

Referring now to FIG. 1B, there is illustrated a system 10 that permits, in accordance with one embodiment of the present invention, production of nanotubes of any determined length. The system 10, as shown, includes a reservoir 11 within which an aqueous volume of graphite feed stock material, for example, liquid trichlorobenzene or dichlorobenzene or other suitable liquid, may be accommodated. The graphite feed stock material may also be initially be peptized by tannin to form an aqueous solution, e.g., aquadag, or a dispersion in oil, e.g., oildag. In one embodiment, the aqueous solution or the dispersion in oil or water may consist of deflocculated graphite.

The system 10 may also include a drum 12 partially submerged within the aqueous graphite feed stock material in the reservoir 11. The placement of the drum 12 in such a manner permits a substantially uniform thin liquid layer (i.e., single atom thickness) of the feed stock material to be deposited onto an outer surface 121 of drum 12. As drum 12 rotates, a continual deposition of the feed stock material may be deposited onto the outer surface 121 of drum 12. It should be noted that in some instances a lead (i.e., starter substrate), such as Mylar® or other suitable starter webbing, may be used to facilitate the initiation of the continuous thin layer of feed stock material. The lead (not shown) may be placed on the outer surface 121 of drum 12 and the feed stock material may be deposited thereon as the drum rotates through the reservoir 11. Although illustrated as being partially submerged, it should be appreciated that drum 12 can be substantially or fully submerged within the aqueous graphite feed stock material.

The system 10, in one embodiment, may also be provided with a source for emitting ionizing radiation, such as laser 13, adjacent to drum 12 to aid in the formation of a sheet of feed stock material from the thin liquid layer on drum 12 for use in the manufacturing of nanotubes. In accordance with an embodiment, as the thin layer of feed stock material on the outer surface 121 of drum 12 gets rotated upward (i.e., counterclockwise from the perspective on FIG. 1B), laser 13 may be used to remove non-carbon atoms deposited. Specifically, the laser 13 may be used to ionize the non-carbon atoms into a gas, so that these non-carbon atoms may subsequently be desorbed from the layer of feed stock material. The remaining carbon atoms on the layer of feed stock material can thereafter be permitted to form a sheet 14 of graphene material that is approximately a single atom in thickness.

The system 10 of the present invention may also include feed roller 15 positioned downstream from the drum 12. The presence of feed roller 15 in system 10, in one embodiment, can assist the progress of sheet 14, as sheet 14 comes off of drum 12, along to the next stage as well as the remainder of system 10. It should be noted that the presence of a lead on sheet 14, although not necessary, can help to facilitate the direction of the sheet 14 toward and subsequently on to feed roller 15 for movement thereafter along the system 10 and such a transport medium may be continuous such as a belt structure or structures that may be constructed of a suitable belt material or materials.

Still referring to FIG. 1B, system 10 may further include alignment roller 16, positioned down stream of feed roller 15, which may be adjusted laterally to help adjust the alignment of sheet 14 along its path within system 10 for subsequent nanotube formation. In particular, the inclusion of the alignment roller 16 can help to properly align the sheet 14 so that it may be aligned and fed into a set of cutting rollers 17 and 18. Exiting rollers 17 and 18 are nanotubes or nanofibers 20, which can be wound for storage around uptake roller 19.

Thus, in embodiments, the graphene sheet material may be aligned by means of feeder rollers to define a chiral angel of a hexagon helix lattice structure about the axis of the carbon nanotube lattice structure to be formed. Thereafter, the graphene sheet material may be fed to cutter rollers to break the covalent bonds of the graphene sheet by suitable cutting means. In this manner, the diameter of the carbon nanotube structure to be formed may be defined.

Figure 2A:
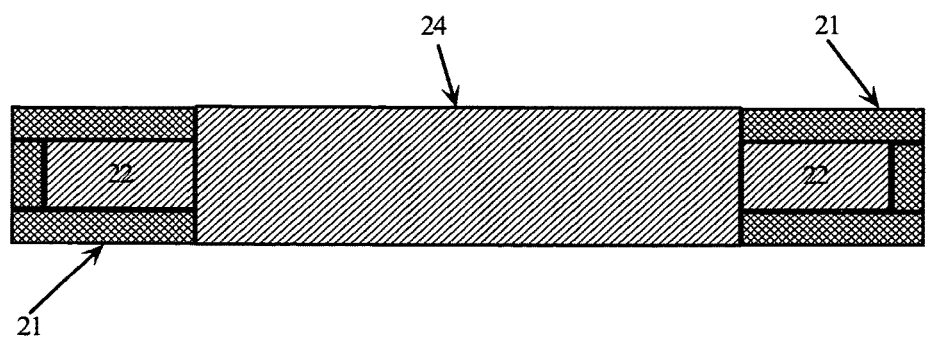
FIG. 2A illustrates a cross sectional view of examplary rollers for use in connection with the system shown in FIG. 1B.
Figure 2B:
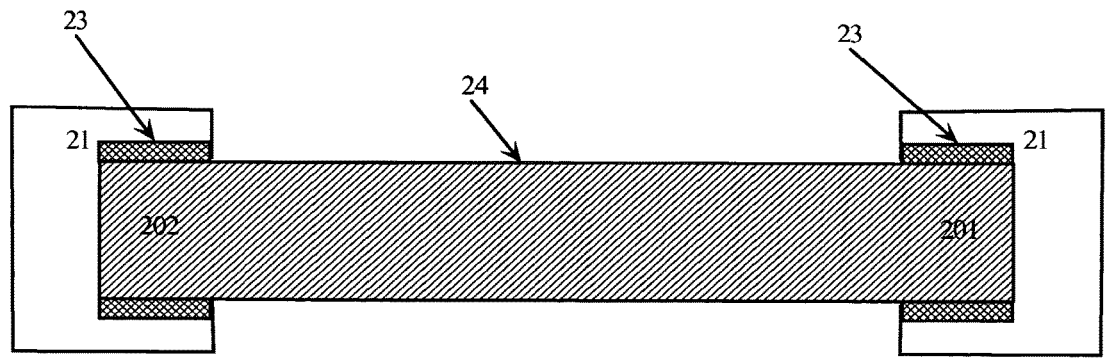
FIG. 2B illustrates a cross sectional view of other exemplary rollers for use in connection with the system shown in FIG. 1B.

The drum 12 and rollers 15, 16, 17 and 18 used in connection with system 10 of the present invention, in one embodiment, may be designed to have common features similar to that shown in connection with roller 24. As illustrated in FIGS. 2A and 2B, roller 24 may include a casing support 21 (i.e., socket) for housing a shaft 22 attached to each end of roller 24. Casing supports 21 act to support the roller 24 and provide an area within which the shaft 22 may rotate as roller 24 rotates. In an alternative embodiment, should it be desired, the roller 24 may be designed so that its ends 201 and 202 (see FIG. 2B) may act in place of shaft 22. To facilitate rotation of the roller 24 within casing supports 21, bearings 23 may be provided circumferentially about an inner surface of the casing support 21 and/or circumferentially about the shaft 22 or ends 201 and 202.

It should be appreciated that the rollers of the present invention, and their respective components, such as those described in FIGS. 2A and 2B, may be designed to be of any size, geometry or form, ranging from nanoscale or larger in size, depending on the application and the mechanical torque rotation action desired.

Figure 3:
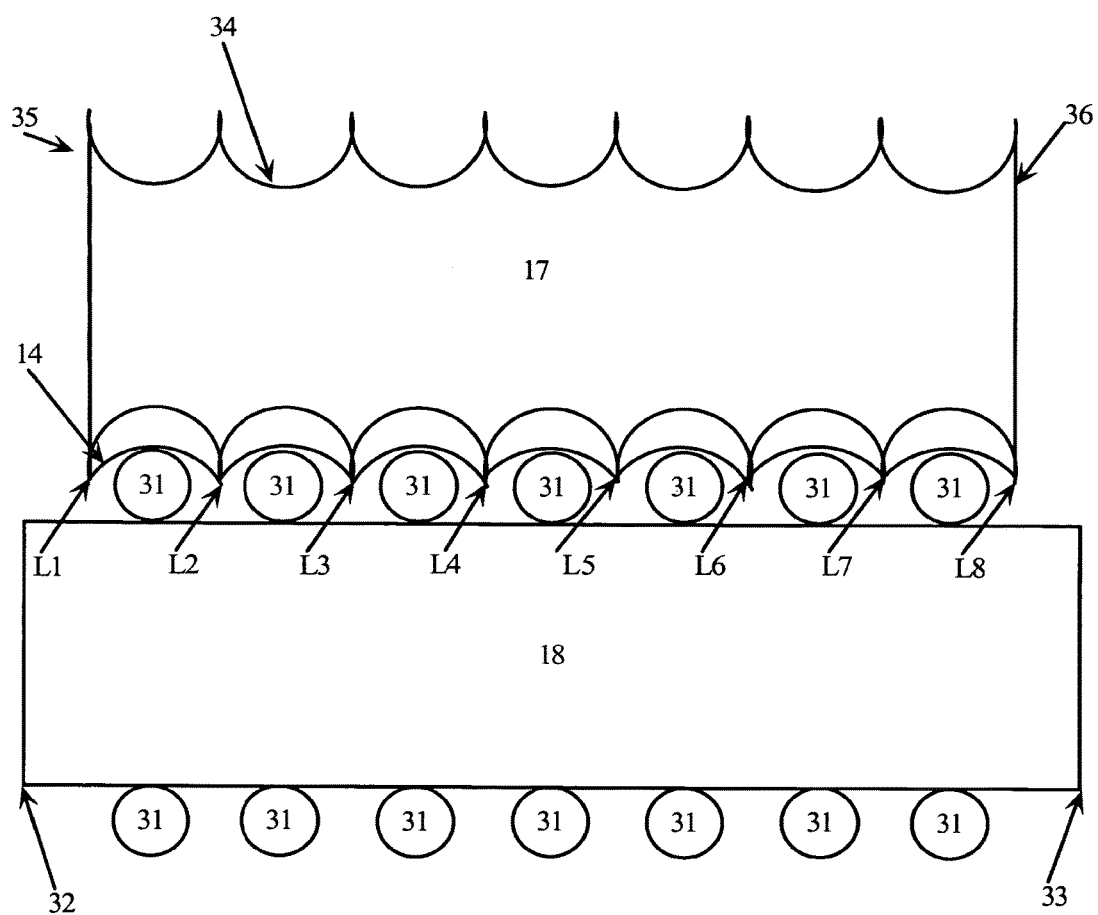
FIG. 3 is a cross sectional view of a set of cutting rollers prior to the point of contact between the rollers for use in connection with the system shown in FIG. 1B.

With reference now to FIG. 3, there is shown a cross sectional view of a set of cutting rollers 17 and 18 prior to the point of contact between the rollers, at the beginning of the process of cutting the graphene sheet or other sheet material 14 into a plurality of strips. In accordance with one embodiment of the present invention, one of cutting rollers 17 and 18 may be designed as a "male" roller, while the other may be designed as a "female" roller. As shown in FIG. 3, cutting roller 18 may be designed to be the "male" roller, whereas cutting roller 17 may be designed to be the "female" roller. Although illustrated as such, it should be noted that cutting roller 18 may be designed as a "female" roller and that cutting roller 17 may be designed as a "male" roller.

As illustrated, cutting roller 18, in one embodiment, may include at least one torus or toroidal (i.e., doughnut shape) structure 31 placed circumferentially about an outer surface of roller 18. In certain embodiments, a plurality of toroidal structures 31 may be employed, such as that shown in FIG. 3, with each toroidal structure 31 being spatially positioned successively from one end 32 to an opposite end 33 of roller 18. The presence of toroidal structures 31 provides a surface upon which sheet 14 may initially be placed and around which the sheet 14 may be cut into strips for subsequent formation of nanotubes. The toroidal structure 31, in accordance with one embodiment of the invention, may be placed flush against the outer surface of roller 18, as shown in FIG. 3. Alternatively, the toroidal structures 31 may be complimentary to structure 34 in which the geometries are concave structures such as 34 and complementary convex structures in shape. In such an embodiment, the two concave and convex geometries of each cutter roller are such that they would accommodate each other and fit within each other. The toroidal structures may be constructed of various materials such materials can have extreme broad structural variability as in graphite (trigonal) or diamond-like (tetrahedral) bonds, crystalline and/or amorphous atomic arrangements that may be homogeneous or heterogeneous structures with inclusions of graphitic, fullerene-like structures wherein such structures such as diamond or diamond like materials and/or fullerene materials such as diamonoid or carbon nanotubes that have been joined via electron beam welding and/or formed using vacuum deposition methods enabling preparations of such different atomic structures for optimum adaptation to industrial process demands wherein such process are used to join structures to themselves and to other supporting structures such as the roller 18 in FIG. 3.

Still looking at FIG. 3, cutting roller 17, on the other hand, may include at least one trough 34 that may be placed circumferentially about the surface of roller 17 such that it complementarily receives the toroidal structure 31 or other complementary structure on cutting roller 18. In the event there is a plurality of toroidal structures 31 roller 18, a similar number of troughs 34 may be provided on roller 17. The troughs 34, in such an embodiment, may be successively positioned from one end 35 to an opposite end 36 of roller 17, so that each trough 34 may accommodate an opposing toroidal structure 31 or other complementary structure on roller 18.

Figure 4:
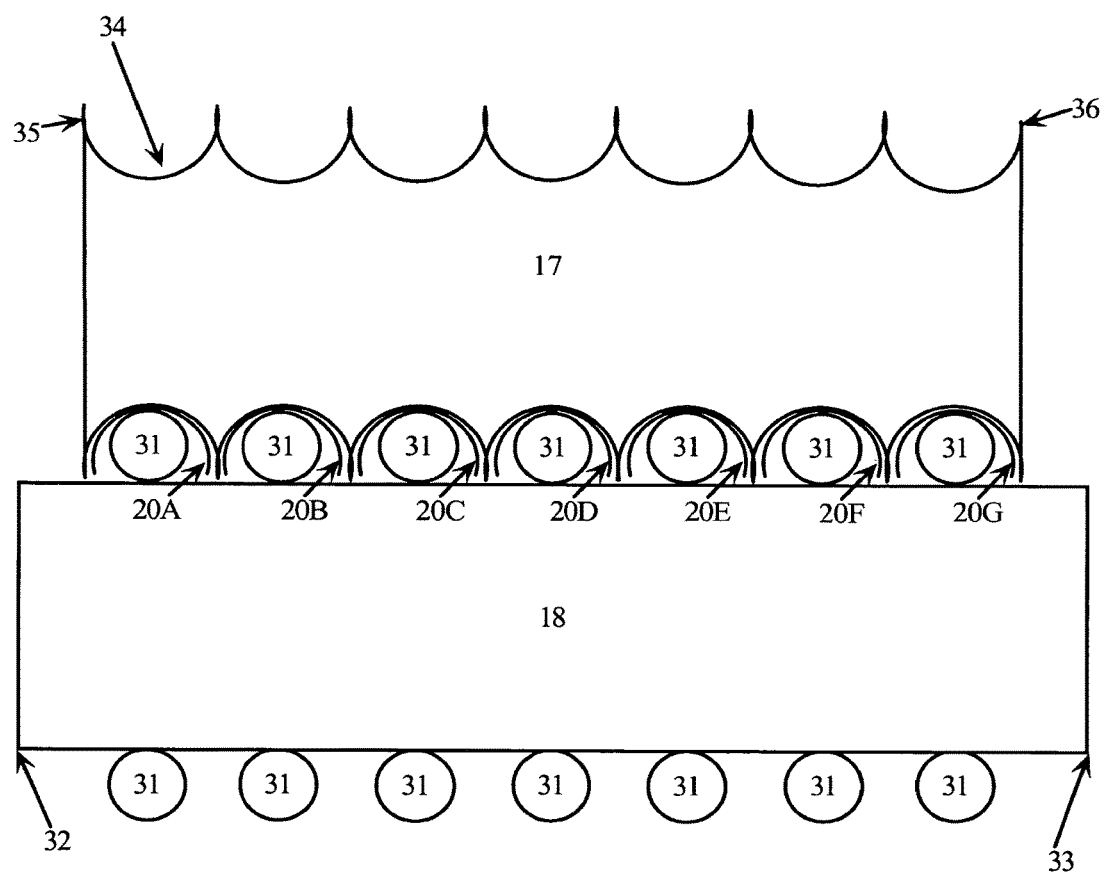
FIG. 4 is a cross sectional view of the cutting rollers shown in FIG. 3 at the point of contact between the rollers.

Looking now at FIG. 4, there is shown a cross sectional view of the cutting rollers 17 and 18 in FIG. 1B, at the point of contact between rollers 17 and 18. As sheet 14 moves towards the point of contact between the two rollers, sheet 14 may get progressively more curled about toroidal structures 31, which can result in weakening of covalent bonds of the graphene sheet 14 at the loading points L1 through L8 in FIG. 3. Upon reaching the point of contact between the rollers 17 and 18, edges L1-L8 (i.e., load points), provided between troughs 34 on roller 17, act to place a sufficient mechanical force against the sheet material 14 to cause the covalent bonds in sheet 14 to shear or break at the loading points L1-L8, resulting in the formation of curled strips of graphene 20A, 20B, 20C, 20D, 20E, 20F, and 20G.

Troughs 34, in one embodiment, may be designed to have similarly sized diameters, such as that shown in FIG. 3, so that the curled strips 20A-20G may be provided with similarly sized widths. However, should it be desired, troughs 34 can be designed so that they vary in diameter sizes to provide strips of varying widths. Moreover, as indicated above, rollers 17 and 18 and their respective components may be of any size or scale, e.g., nanoscale, milliscale, microscale or macroscale.

However, regardless of their sizes, it should be noted that troughs 34 and toroidal structures 31 positioned on rollers 17 and 18 respectively, may be nanoscale or larger features in size in order to permit formation of nanoscale or larger strips 20A-20G for the subsequent manufacture of nanotubes or larger scale structures.

Figure 5:
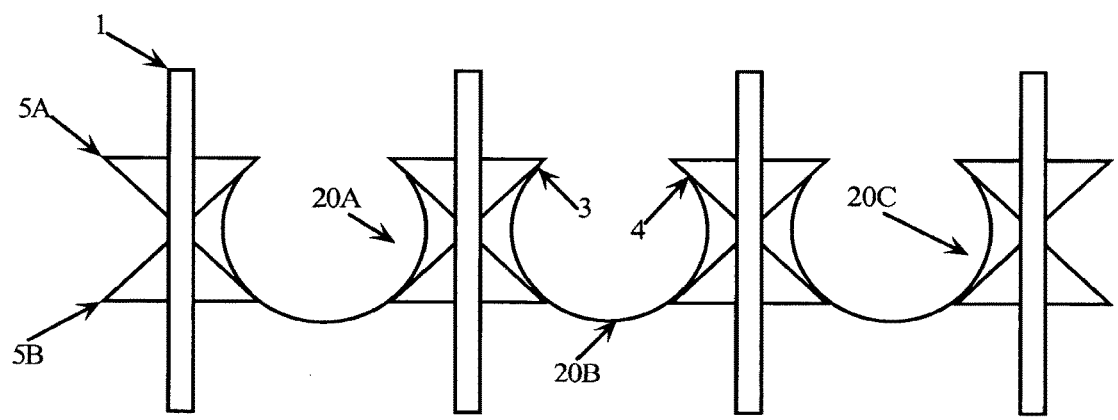
FIG. 5 is a cross sectional view of one set of forming rollers for use in connection with the system of FIG. 1B during one stage of forming nanotube structures.

Referring now to FIG. 5, the system 10 may further be provided with a set of forming rollers (not shown in FIG. 1) to further curl (i.e., deform) the graphene strips 20A-20G into carbon nanotubes. As shown FIG. 5, an upper forming roller 5A and a lower forming roller 5B which may be a nanocone, nanospiral or constructed of a diamond or diamond-like material that may be provided downstream of cutting rollers 17 and 18. Each of the upper and lower forming rollers 5A and 5B, in one embodiment, can make up cone sets or former rollers 3 as in FIGS. 7 and 8 respectively that may be spatially positioned about a shaft 1 with spacers (not shown) that are used to provide support similar to that provided by the casing support structures 21 in FIG. 2B and prevent lateral movement of said cone sets or former rollers 3. Each of the cone sets or former rollers 3 includes trough regions respectively. These troughs may have variations as to geometry to facilitate the progressive tube formation process of FIG. 1A. In addition, cone sets or former rollers 3 in FIGS. 7 and 8 on roller 1 may preferably be opposingly aligned with cone sets or former rollers 3 on another roller 1, so that the troughs formed may form pathways through which curled graphene strips 20A-20G may be accommodated when they exit from rollers 17 and 18. By providing troughs with a progressively smaller diameter relative to the previous stage or stages thus causing the strips 20A-20G to be curled further, edges 3 and 4 on each of curled strips 20A-20G may be progressively pushed closer toward one another with each stage of former rollers 3 in FIGS. 7 and 8 or 5A and 5B in FIGS. 5 and 6.

Figure 6:
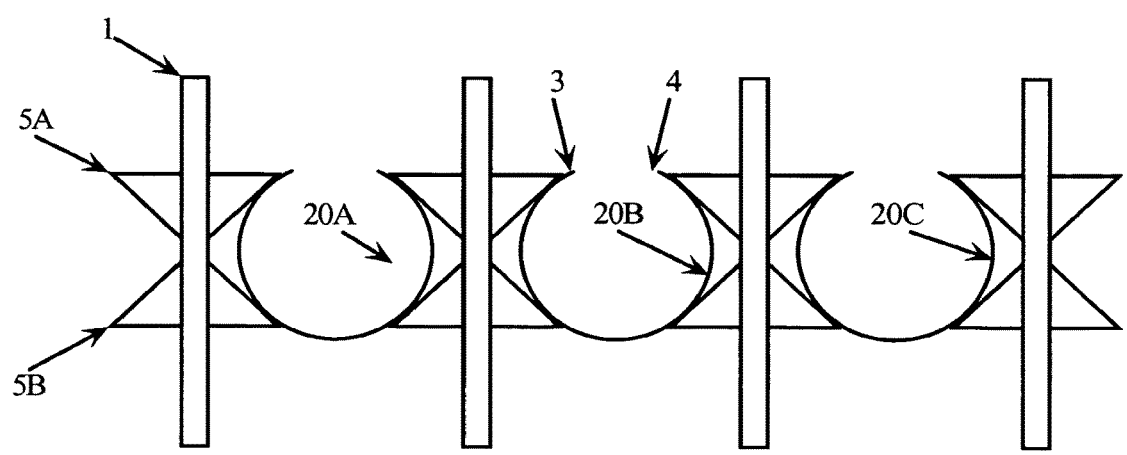
FIG. 6 is a cross sectional view of another set of forming rollers for use during another stage of forming nanotube structures.

To enable the edges 3 and 4 to get incrementally closer toward one another, a series of rollers 1 and former rollers 3 in FIG. 7 and 8 or 5A and 5B in FIGS. 5 and 6 or cone sets may be provided down stream of one another, each with former rollers 3 in FIGS. 7 and 8 or 5A and 5B in FIGS. 5 and 6 providing troughs that are incrementally smaller for the pathway between said former rollers 3 in FIGS. 7 and 8 or 5A and 5B in FIGS. 5 and 6. In this manner, when the cone sets or former rollers 3 in FIGS. 7 and 8 or 5A and 5B in FIGS. 5 and 6 are opposingly aligned, successively smaller pathways may be presented to the curled strips 20A-20G, such that the edges 3 and 4 may be brought successively closer to one another (see FIG. 6) until they are sufficiently close to permit dangling bonds projected from edges 3 and 4 to join, thereby forming a tube structure from each of the curled graphene strips 20A-20C and so on as in FIG. 8.

Alternatively, the widest point of troughs formed, e.g., diameter of the former roller 3 in FIGS. 7 and 8 or 5A and 5B in FIGS. 5 and 6, may remain the same throughout the downstream series of rollers 1 and former rollers 3 in FIGS. 7 and 8 or 5A and 5B in FIGS. 5 and 6 or may be altered in diameter and/or geometry. The spacing between opposing cone sets or former rollers 3 in FIGS. 7 and 8 or 5A and 5B in FIGS. 5 and 6 on roller 1 may get incrementally smaller. In this manner the pathways formed by the troughs in opposing cone sets or former rollers 3 in FIGS. 7 and 8 or 5A and 5B in FIGS. 5 and 6 may get incrementally smaller to bring edges 3 and 4 successively closer to one another. Should it be desired, a combination of incrementally smaller diameter in troughs formed between former rollers 3 in FIGS. 7 and 8 or 5A and 5B in FIGS. 5 and 6, and smaller spacing between opposing cone sets or former rollers 3 in FIGS. 7 and 8 or 5A and 5B in FIGS. 5 and 6 and/or shafts 1 may be implemented to facilitate the joining of edges 3 and 4 to form nanotubes from each of the curled graphene strips 20A-20G.

Figure 7:
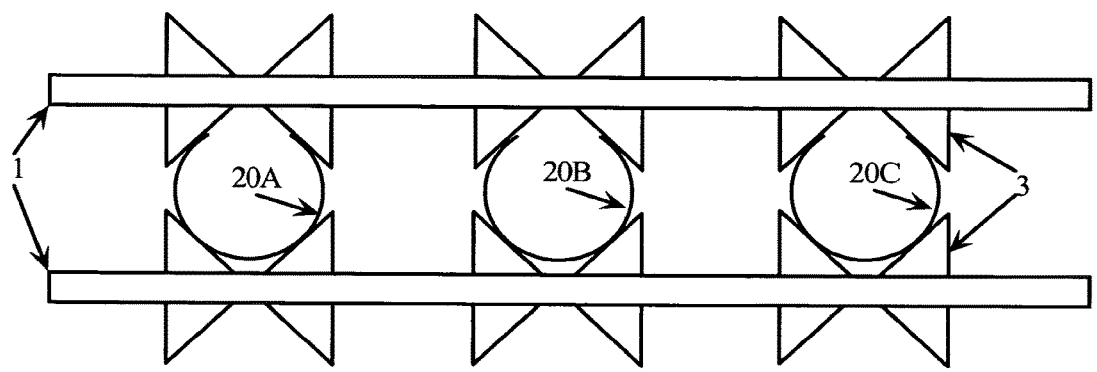
FIG. 7 is a cross sectional view of an alternate set of forming rollers for use in connection with the system of FIG. 1B.
Figure 8:
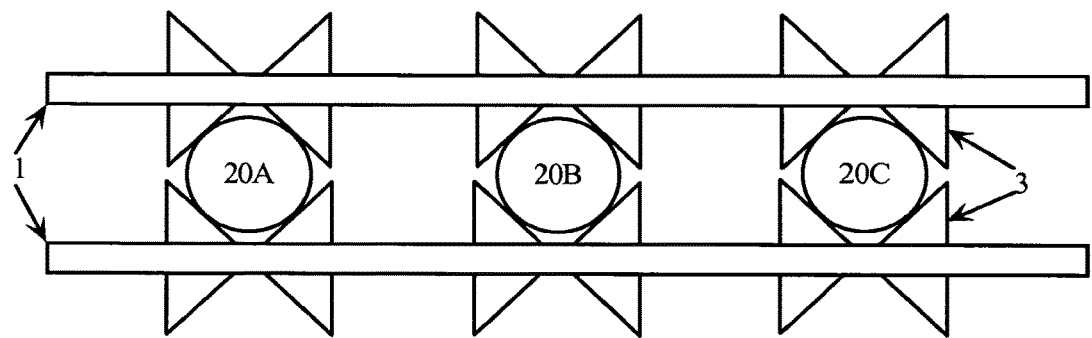
FIG. 8 is a cross sectional view of another set of alternate forming rollers for use during another stage of forming nanotube structures.

FIG. 7 illustrates another possible set of forming rollers that may be used in connection with the system 10. Rather than having opposing left and right forming rollers with cone sets 5A and 5B, such as those shown in FIGS. 5 and 6, there is an upper and lower former rollers 3, for instance, may be provided at an orientation that is substantially transverse to rollers 5A and 5B shown in FIGS. 5 and 6. FIG. 7 provides a set of forming rollers that are rotated approximately 90 degrees from the position of rollers 5A and 5B (from the perspective of FIGS. 5 and 6). Like rollers 5A and 5B, a series of former rollers 3 may be provided with incrementally smaller trough diameters, or incrementally smaller spacing between opposing roller shafts 1, or both, so as to facilitate the joining of edges 3 and 4 of strips 20A-20G.

Figure 9:
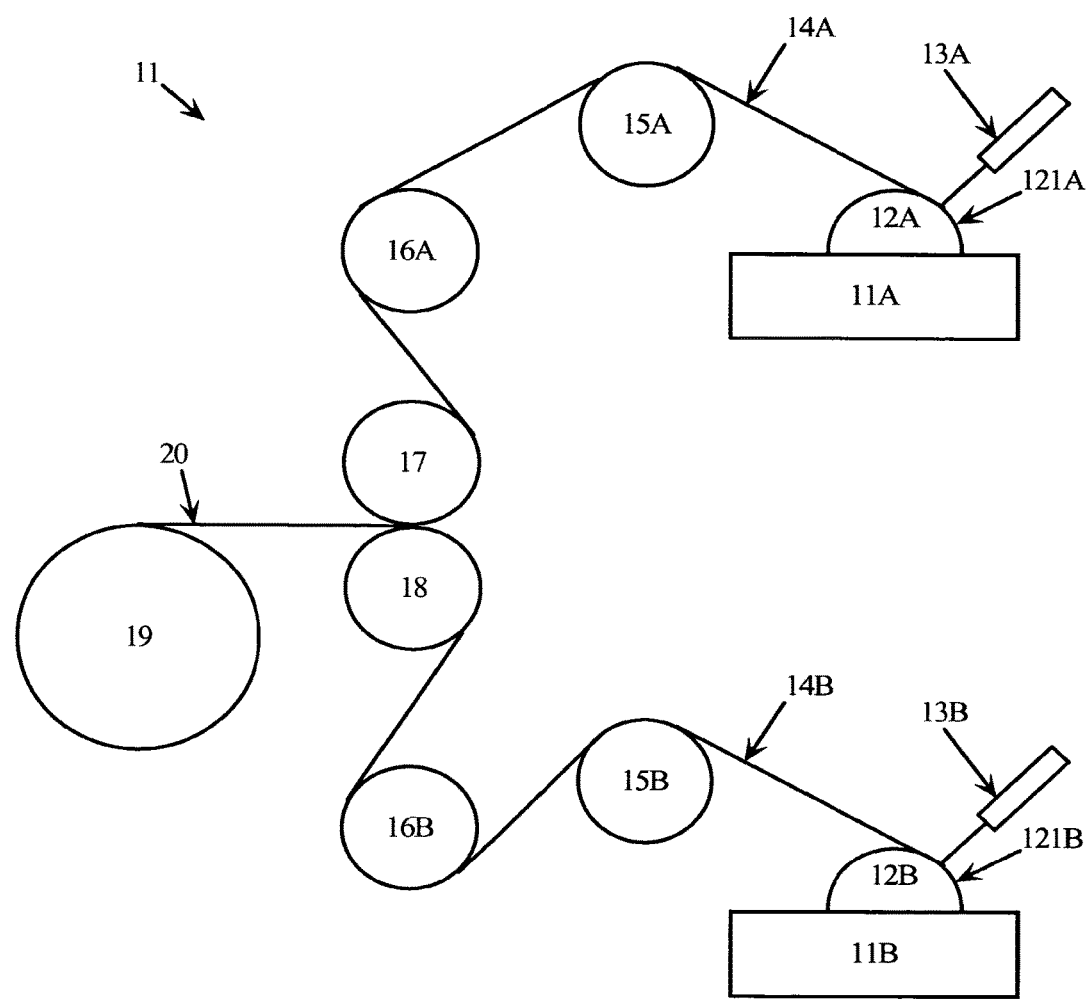
FIG. 9 illustrates another system for manufacturing nanotube structures in accordance with one possible embodiment of the present invention.

Looking again at FIG. 1B, system 10 may be provided with uptake roller 19 situated downstream from the cutting rollers 17 and 18 and forming rollers 3 in FIGS. 7 and 8 or 5A and 5B in FIGS. 5 and 6 once the edges on each of the curled strips are joined to form a continuous strand of nanotube or nanofiber or larger tube structure, the strands of tube structures or nanotube fibers may be advanced from the forming rollers 3 in FIGS. 7 and 8 or 5A and 5B in FIGS. 5 and 6 toward uptake roller 19. In particular, roller 19 may be rotated to wrap, about its outer surface, the strands of nanotubes coming from the former rollers 3 in FIGS. 7 and 8 or 5A and 5B in FIGS. 5 and 6, in a manner similar to a thread spool, for subsequent storage. Should the strands of nanotubes be needed at a later point, they can be unrolled from the uptake roller 19 and cut to a desired length for use or they may be used as a supply of nanotubes for the manufacture of multi-walled nanotubes (MWNT) wherein such nanotubes are used in place of the static nanotubes 1A-1E of FIGS. 10A and 10B and 11A and 11B thus the formed nanotubes can be used to move along with the newly formed nanotubes of the process as shown in FIG. 9 that will produce a multi-walled nanotube in which the process can be cascaded into several similar steps to add additional walls of nanotubes if desired.

To the extent that these strands of nanotubes may need to be cut to produce nanotubes of a desired length, the strands may be cut using, for example using, Mechanical Energy, Chemical Energy, Thermal Energy, Laser Energy, Electron Beam Energy, Ion Beam Energy, Acoustical Energy, and/or any other type of energy alone or in combination, necessary to break the covalent bonds within the material.

It should be noted that although FIG. 1B provides a system with the components as illustrated, these components may be arranged in any manner desirable. For instance, feed roller, alignment roller, cutting rollers, forming roller may be in linear arrangement between the reservoir and the uptake roller, so that the sheet 14 may be fed straight on toward the cutting rollers thus simplifying the path for sheet 14. Also any device or process that contains fewer and/or different elements such as to accomplish the formation process of FIG. 1A for manufacturing nanotubes from sheet material 14. In one such arrangement the various sections with drums or rollers would be condensed wherein the cutter rollers would be used in the first step of the process wherein the cutter roller would be coated with a thin film of trichlorobenzene or dichlorobenzene other suitable liquid for the purpose of directly forming graphene strips into the etched nanoscale features with laser energy or other suitable energy source such as an electron beam and/or ion beam such that strips of graphene are produced according to the geometry of the nanoscale features of the macroscopic roller as opposed to the mechanical formation or mechanosynthesis of strips of graphene from graphene sheet material. In such a condensed process of fewer steps and/or elements graphene would be formed into strips directly onto the nanoscale surface features of the roller that would allow for the curvature of the graphene strips formed and allow for the edge bonds to complete themselves forming a tube or the formed graphene strips may need further possessing to complete the edge bonds into a tube structure by means of manipulation of the edges by means of electric and/or magnetic fields and/or by means of a mechanosynthesis process wherein the edge bonds are brought closer to each other such as to cause the joining of the edge bonds into a tube structure or nanofiber.

As the rollers for use in connection with system 10 and 11 need to be sufficiently solid and strong to minimize thermal expansion and degradation from wear and tear, the materials from which they may be made may also need to be sufficiently solid and strong. Accordingly, the materials which may be employed includes diamond or diamond like coated solid materials such as graphite, glassy carbon, or other carbon based material such as fullerenes in there various forms, or may include other materials such as solid diamond, quartz, or metals or any other suitably stiff material such as tin carbide, or tungsten carbide or any combination or matrix composite material that is suitably stiff, such structures may be constructed of various materials such materials can have extreme broad structural variability as in graphite (trigonal) or diamond-like (tetrahedral) bonds, crystalline and/or amorphous atomic arrangements that may be homogeneous or heterogeneous structures with inclusions of graphitic, fullerene-like structures wherein such structures such as diamond or diamond like materials and/or fullerene materials such as diamonoid or carbon nanotubes that have been joined via electron beam welding and/or formed using vacuum deposition methods enabling preparations of such different atomic structures for optimum adaptation to industrial process demands wherein such process are used to form structures for use in connection with system 10 and 11.

With reference now to FIG. 9, there is shown another system 11 for use in the manufacture of nanotubes of any determined length. System 11, in one embodiment, may include section A, essentially substantially system 10 shown in FIG. 1B, and an additional substantially duplicate section B, so as to provide two independent sections, each capable of generating complementary continuous graphene sheets, from which curled strips may be cut from section A with curled strips cut from section B to form strands or fibers of tube structures or nanofibers.

System 11, like system 10, may be designed to include reservoirs 11A and 11B respectively within which an aqueous volume of graphite feed stock material, for instance, liquid dichlorobenzene or trichlorobenzene other suitable liquid, may be accommodated. It should be appreciated hereinafter that when referring to features of system 11, those features provided in section A will be followed with the letter "A", while those features provided in section B will be followed with the letter "B".

The system 11 may also include drums 12A and 12B within respective reservoirs 11A and 11B. The drums 12A and 12B may be partially submerged, as shown in FIG. 9, substantially submerged or fully submerged, so long as they permit a substantially uniform thin layer of aqueous feedstock material to be deposited on to the outer surface 121A of drum 12A and 121B of drum 12B. A lead or starter substrate (not shown), such as Mylar®, may be used to facilitate the initiation of a continuous thin layer of feed stock material. In one embodiment, the lead may be placed on the outer surface 121A and 121B to allow the feedstock to be deposited thereon as each of the drums 12A and 12B rotates within its respective reservoir.

The system 11 may further include source for emitting ionizing radiation, for instance, lasers 13A and 13B, adjacent drums 12A and 12B respectively. Lasers 13A and 13B may be used to ionize non-carbon atoms on the thin layer of liquid feed stock material into a gas, so that these non-carbon atoms may subsequently be desorbed from the layer of feed stock material. The remaining carbon atoms on the layer of feed stock material can thereafter be permitted to form sheets 14A and 14B of graphene that is approximately a single atom in thickness for use in the formation of nanotubes.

Downstream of the drums 12A and 12B, system 11 may be provided with feed rollers 15A and 15B. Feed rollers 15A and 15B, in one embodiment, can act to assist the progress of sheets 14A and 14B respectively, as they come off of drums 12A and 12B, along the remainder of system 11. It should be noted that the presence of a lead on sheets 14A and 14B, although not necessary, could help to facilitate their direction toward and subsequently on to feed rollers 15A and 15B.

Still referring to FIG. 9, system 11 may further include alignment rollers 16A and 16B, situated down stream of feed rollers 15A and 15B respectively. Alignment rollers 16A and 16B, in accordance with one embodiment, can be used to adjust and properly align sheets 14A and 14B, so that the sheets may be properly aligned and fed into cutting rollers 17 and 18 of system 11. The take up roller 19 is rotated to take up and used to accommodate the manufactured nanotubes 20.

Figure 10A:
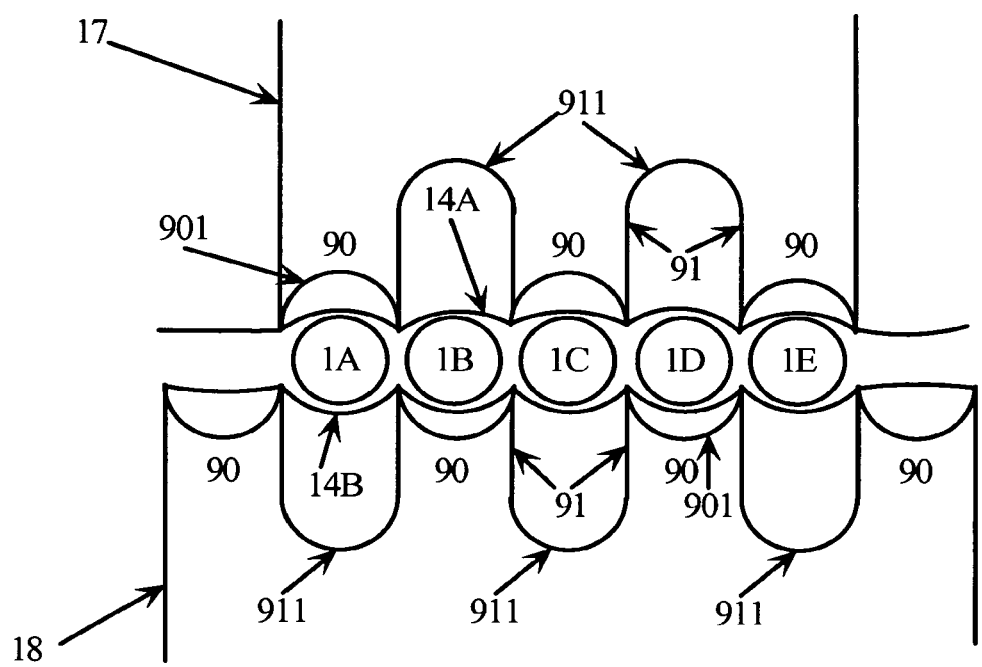
FIG. 10A is a cross sectional view of a set of cutting rollers prior to the point of contact between the rollers for use in connection with the system shown in FIG. 9.

Looking now at FIG. 10A, a cross sectional view of a set of cutting rollers 17 and 18, taken from FIG. 9, prior to a point of contact between the rollers, at the beginning of the process of cutting the graphene sheets 14A and 14B into a plurality of strips. Each of rollers 17 and 18, in one embodiment, may be designed to include a series of alternately positioned teeth 90 having a relatively shallow trough 901 and grooves 91 comprising relatively deep troughs 911 circumferentially situated about the roller from one end to an opposite end. Such a design allows each tooth 90 on either of rollers 17 and 18 to be complementarily paired with and received within an opposing groove 91 on the other roller.

Figure 10B:
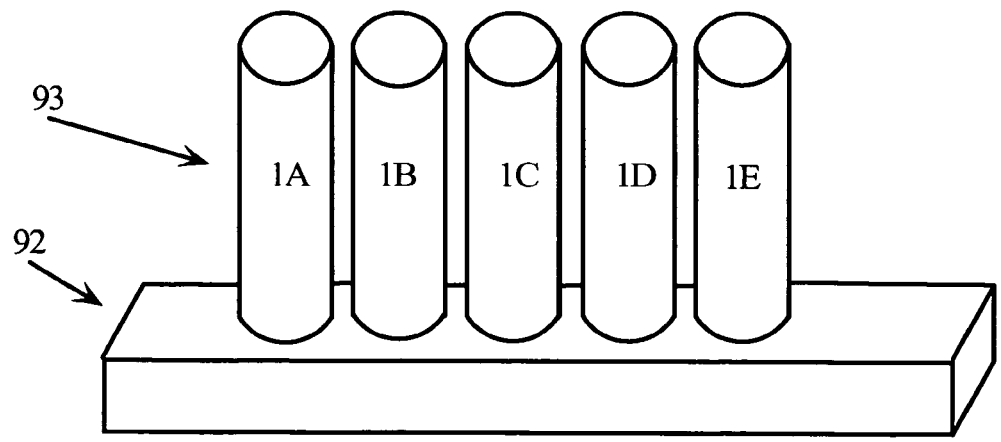
FIG. 10B is a view of the mold formers used in connection with the cutting rollers of FIG. 10A.

This alternating trough design permits a platform or mold former 93 in FIG. 10B having a plurality of tube structures 1A, 1B, 1C, 1D and 1E to be positioned between the rollers 17 and 18 in alignment with the teeth 90 and grooves 91.

Referring to FIG. 10B, tubes 1A, 1B, 1C, 1D and 1E make up the mold former tubes 93 and are attached to a static bar or platform 92 which prevents the attached tubes from moving along with the newly formed tube structures thus the former tubes 93 remain in place to function as a mold for the formation process. Although the tubes 1A-1E are static they are flexible enough and long enough to allow for the tubes to be in alternating positions shown in FIG. 11A.

Former tubes 93 is similar in function to the toroidal structure 31 in FIG. 3, in that it provides a surface upon which sheets 14A and 14B may initially be placed, and around which the sheets 14A and 14B may be formed and cut into strips for subsequent formation of nanotubes. It should be noted that each of sheets 14A and 14B will be placed on opposing surfaces of former 93, so that the two sheets 14A and 14B may be separated in between by former tubes 93. The former tubes 93, in one embodiment, may be made from a series of nanotubes 1A, 1B, 1C, 1D, 1E and so on, such that the tubes or former tubes 93 substantially fit between opposing teeth 90 and grooves 91. In addition, the former tubes 93 may be made to include any diameter of a predetermined size, depending on the size of the tubes to be formed that may be of nanoscale or larger.

Figure 11A:
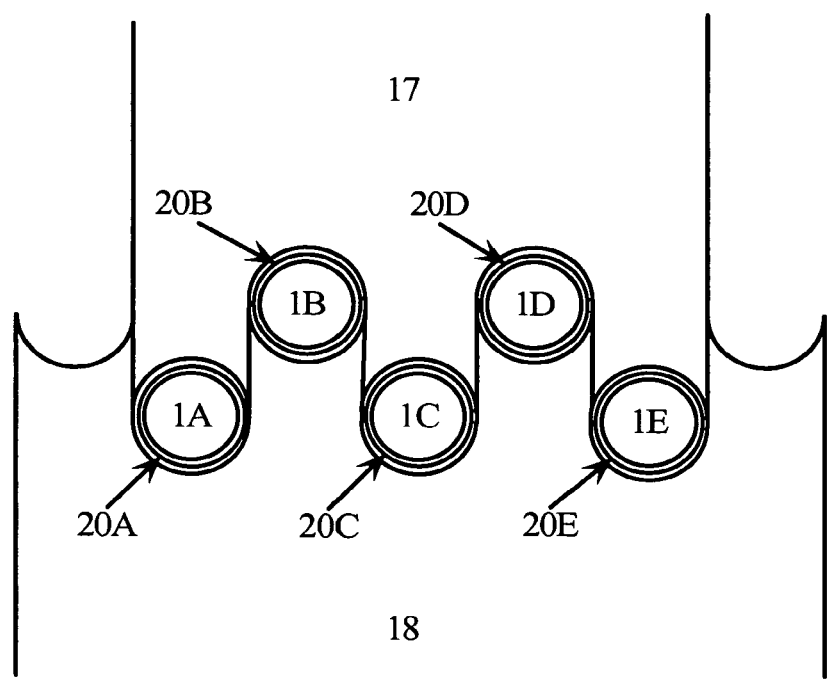
FIG. 11A is a cross sectional view of the cutting rollers shown in FIG. 9 at the point of contact between the rollers.
Figure 11B:
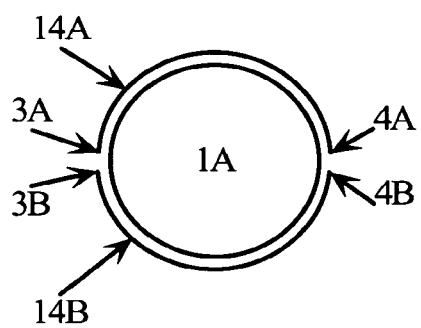
FIG. 11B is a cross sectional view or close up view of the strips that are joined in the formation of tubes 20A-20E in FIG. 11A.

Looking now at FIG. 11A, there is shown a cross sectional view of the cutting rollers 17 and 18, from FIG. 9, at the point of contact between rollers 17 and 18. As sheets 14A and 14B are moved across opposing surfaces of platform 93 toward the point of tangent between the two rollers, sheet 14A and 14B may get progressively more curled about each nanotube 1A-1E on the platform 93, as teeth 90 move closer and into opposing grooves 91, resulting in the deformation of covalent bonds of the graphene sheet 14A and 14B. Upon reaching the point of contact between the rollers 17 and 18, teeth 90 may be designed to push nanotube 1A-1E of platform 93, and sheets 14A and 14B on each side thereof, firmly and substantially completely within opposing grooves 91. As a result, teeth 90 may act to place a sufficient amount of force against the surface of sheets 14A and 14B to cause the covalent bonds in the sheets to shear or break, resulting in the formation of temporarily curled strips 14A, on one side of the platform 93 and temporarily curled strips 14B on the other side of the platform 93 as shown in FIG. 11B. The curled strips 14A and 14B self join thus creating carbon nanotube structures 20A, 20B, 20C, 20D and 20E.

Looking now at FIG. 11B, there is shown a cross sectional view of the strips of graphene formed from the cutting rollers 17 and 18, from FIG. 9, at the point of contact between rollers 17 and 18. The upper graphene sheet 14A is cut into a strip of graphene with newly created edges 3A and 4A and the lower graphene sheet 14B is also cut into a strip of graphene also with newly formed edges 3B and 4B. Edges 3A and 3B join and edges 4A and 4B join due to the highly reactive bonds looking to complete themselves thus forming completed tube structures 20A-20E in FIG. 11A.

In an alternate embodiment, each of rollers 17 and 18 may be provided with troughs (not shown) that are of similar depth, such that opposing troughs on rollers 17 and 18 may extend over about half of the circumference of nanotube former 93 on static platform 92. In this manner, when rollers 17 and 18 have reached their point of contact, opposing troughs on rollers 17 and 18 may act to substantially encase therebetween nanotube former 93 along with sheets 14A and 14B on each side of nanotube former 93. In addition, those edges (i.e., load points) provided between the troughs on roller 17 may act to place a sufficient mechanical force against those edges provided between the troughs on roller 18 to cause the covalent bonds in sheets 14A and 14B to shear or break, resulting in the formation of curled strips 14A in FIG. 11B on one side of the nanotube former 93 and temporarily curled strips 14B on the other side of the nanotube former 93 as shown in FIG. 11B.

Referring to FIG. 11 B upon formation of strips 14A and 14B on each side of nanotube 1A of platform former 93, each of opposing strip pairs 14A and 14B, and so on, will be caused to form nanotubes 20A-20E, and so on around nanotube former 93 of platform 92. In particular, since each opposing strip pairs are positioned about nanotube former 93 so that edges 3A and 4A on one strip are sufficiently close to the edges 3B and 4B on the opposing strip, these edges may join through the dangling bonds projected therefrom to form nanotubes 20A-20E in FIG. 11A from each of the strip pairs.

Referring to FIG. 11A each newly formed nanotube 20A, 20B, 20C, 20D and 20E may thereafter be pulled or removed from its position about the tube former 93 of platform 92 as the newly formed tubes advances from roller 17 and 18, and stored about uptake reel 19 (FIG. 9). To the extent that a double-walled nanotubes are to be formed, the nanotubes 20A-20E may be allowed to move with tube formers 93. Tubes 93, in such an embodiment, may be continuously fed from a reel of stored nanotubes to between rollers 17 and 18. The double-walled nanotubes formed from nanotubes 20A-20E and 1A-1E may thereafter be stored about uptake reel 19, as they advance from rollers 17 and 18. If multi-walled nanotubes are to be formed, the double-walled nanotubes formed from tubes 20A-20E and 1A-1E may be used as a new former, such as former 93, and the process described above may be repeated until nanotubes with the desired number of walls are achieved. Of course it should be appreciated that as the number of walls increase, the size of the troughs and/or teeth may also need to get progressively larger. To that end, at the end of each process the uptake reel of nanotubes may be moved or the manufactured tubes can be transferred directly to a different system with slightly larger troughs and/or teeth.

When the system 10 or 11 involves interactions between nanoscale structures, for instance, graphene sheets and/or nanotubes (i.e, structures being worked/acted upon) with nanoscale rollers, nanoscale troughs/teeth, or nanoscale toroidal structures (i.e., working structures), control of the movement between these nanoscale structures may be accomplished by the surface energy interactions between the working structures and the structures being worked upon.

For example, the processes of feeding a graphene sheet may be accomplished by mechanical means due to the weak pi bonding, which bonding holds the adjacent sheets or layers of graphite, thus allowing graphene layers to be mechanically peeled away from each other by means of mechanical feed rollers wherein the feed rollers may be of nanoscale or larger. This release of graphite layers is an active mechanical cleavage of the graphite crystal due to the torque applied through the feed roller section, which overcomes the weak pi bonding energy of the individual graphene sheets. As the graphene sheets are mechanically peeled away from the graphite feed stock material, the surface energy of the feed rollers and the graphene sheets will interact, to force the graphene sheets to align themselves with the set lattice structure of the feed rollers. If one uses a nanotube or giant nanotube or a series of nanotubes the chirality of the nanotubes used would determine how the peeled sheet of graphene would be aligned and fed into the next stage of the process. In this manner, two tasks may be accomplished; the feeding of single sheets of graphene from graphite feed stock material, and the mechanical alignment of the graphene sheets, which defines the lattice structure or the chiral angle of the nanotube structures formed.

Figure 12:
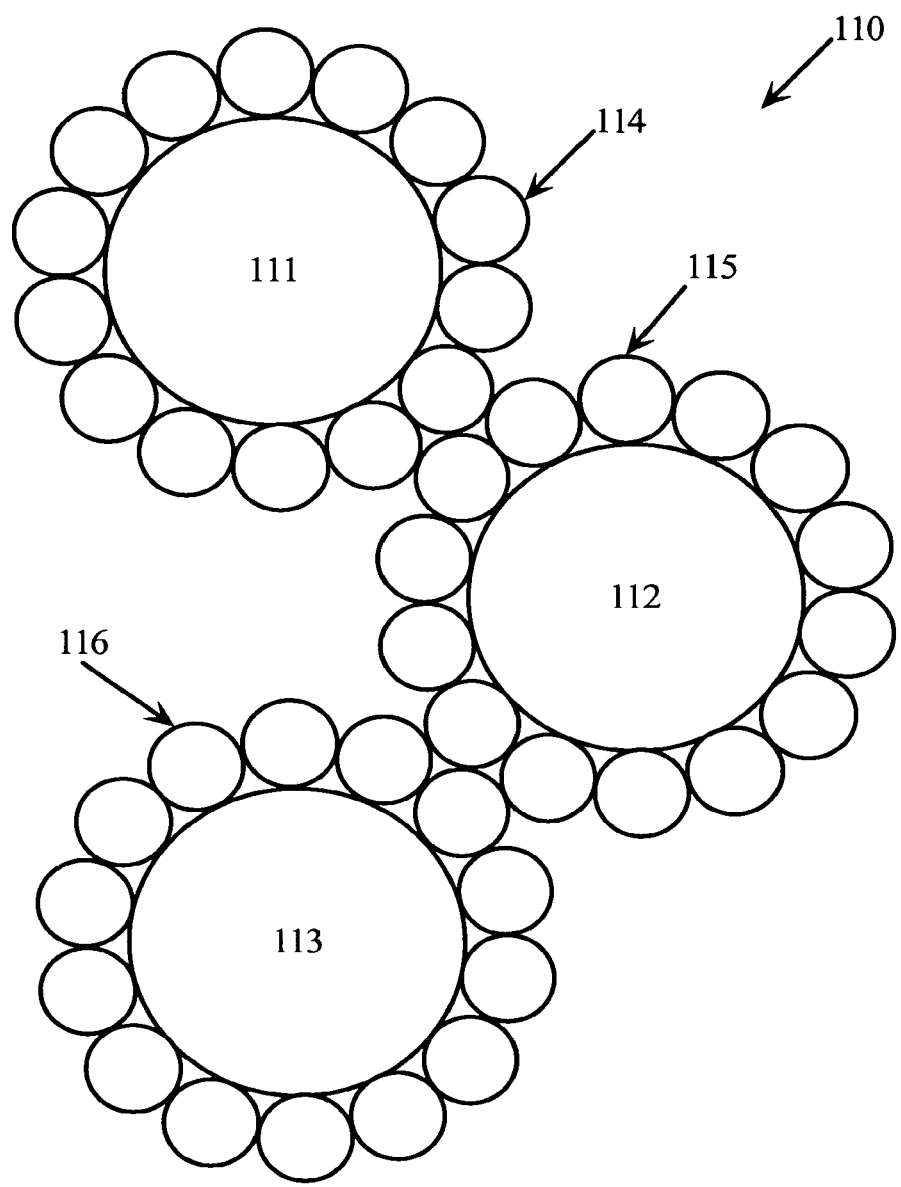
FIG. 12 illustrates an example of various gear systems for use in connection with the systems of the present invention.
Figure 13:
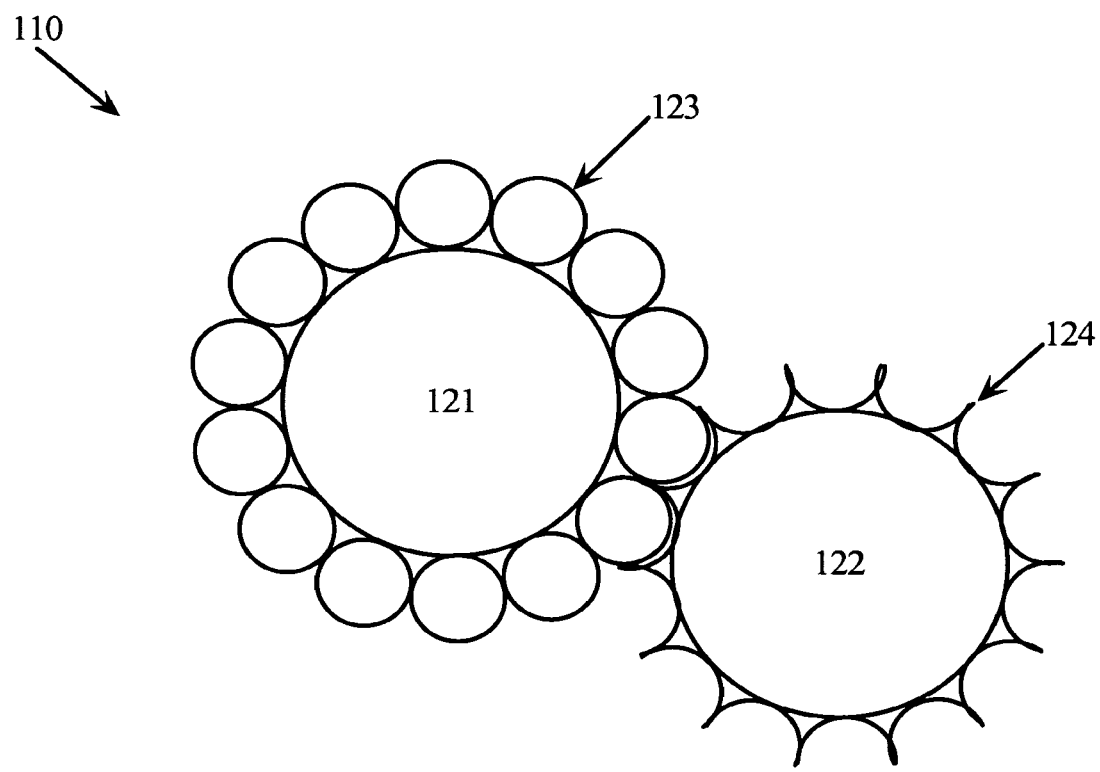
FIG. 13 illustrates another example of various gear systems for use in connection with the systems of the present invention.

Looking now at FIGS. 12 and 13, the rollers of the present invention, whether nanoscale in size or larger, may be coupled to a drive mechanism to facilitate their rotation. The following will be described in connection with nanoscale rollers, but of course can be appropriately scaled to the size necessary. Drive mechanism 110, in one embodiment, may be constructed from a plurality of nanogears, for instance, tube structures 111, 112, and 113.

Tube structure 111, as illustrated in FIG. 12, may have attached about its outer surface gear teeth 114. Gear teeth 114, in one embodiment, may be concave or convex in shape as in FIG. 13 and may be placed adjacent to a series of teeth 114 circumferentially about the outer surface. In addition, the teeth 114 may be positioned so that they compliment another nanotube structure, such as structure 112. Structures 112 and 113, similar to structure 111, have attached about their outer surfaces a plurality of gear teeth 115 and 116 respectively. Gear teeth 115 and 116, in one embodiment, may be nanotubes, and may be placed adjacent to a series of other nanotube teeth circumferentially about the respective tube structure 112 and 113. Gear teeth 114, 115 and 116, as shown in FIG. 12, may be of a size, shape and spacing sufficient to permit the teeth 114 on structure 111 to accommodate teeth 115 on structure 112, and the teeth 115 on structure 112 to accommodate teeth 116 on structure 113. The size and number of the nanogears 111, 112, and 113 may be varied and may be positioned relative to the other structures in any various combinations thereof.

FIG. 13 illustrates another example of nanogears that may be used in connection with the systems of the present invention. Nanotube structures 121 and 122 may have attached about their respective outer surfaces gear teeth 123 and 124. Gear teeth 123 and 124, in one embodiment, may be concave and/or convex in shape, and may be placed adjacent to a series of other gear teeth circumferentially about their respective structure 121 and 122. As with the gear teeth in FIG. 12, these gear teeth may be positioned so that those on structure 121 may mesh with those on structure 122 based on the use of proper shape, spacing and number of gear teeth.

Gear teeth 114, 115, and 116, in accordance with one embodiment, may include benzene or naphthalene molecules, or any other molecules and/or atoms, which may be capable of being, coupled to nanotubes 111, 112, or 113.

The nanomechanical systems, in accordance with one embodiment of the present invention may be summarized as follows. The system may include stationary parts such as roller casing supports that house the nanobearings, and are attached to the outer race of the nanobearings. The system may further include rotary parts such as nanoshafts, which can be attached to the nanobearings inner race. In one embodiment, rollers may be incorporated into various structures. One such possible structure includes a roller former constructed at the nanoscale with feed rollers. The feed roller may be made to include constructed nanotube shafts or nanoshafts. The cutter rollers may be constructed with nanotube shafts or rollers with closed torus nanotubes attached on the upper or lower cutter roller and open torus nanotubes attached to the lower or upper cutter roller. Guide rollers or former rollers may be constructed of nanocone structures, which may be held in position by means of nanotube shafts positioned through the center of said nanocone structures. Such nanoshafts may allow the nanocone structures to turn freely wherein the nanoshafts ends are held in place by a rigid body with spacers in between the nanocones. The spacer can also act to maintain the alignment of said nanocones as they rotate.

Alternatively, the nanoshafts may be attached to said nanocones, in which case the ends of the nanoshafts are allowed to rotate freely within nanobearings or the casing itself. The nanobearings in this embodiment may be housed by an end casing, which is a rigid body. Another possible structure is micro and/or macroscopic scale and/or giant nanotube roller structures in which the surfaces have nanoscale features and/or structures. A further possible structure is a structure which incorporates the use of energy fields such as magnetic and/or electric fields from a laser and/or electron beam and/or ion beam or other suitable source to control the feeding, cutting and forming processes which would not be a purely nano mechanosynthesis process but would be on the nanoscale in the manipulation and formation processes.

In an alternate embodiment, the system of the present invention may be implemented without the roller former section. For instance, should the deformation of the graphene sheet material be sufficient within the roller cutter section to allow the dangling bonds of the edges of the graphene sheet material to join, the roller former section may not be needed to complete the nanotube formation process. In one embodiment, the nanotubes maybe constructed using a nanoscale imprinting or stamping method. In such a process, a positive stamp and a complementary negative stamp or die section, similar to the upper and lower rollers of FIGS. 3 and 4 of the continuous process, may be used.

Figure 14:
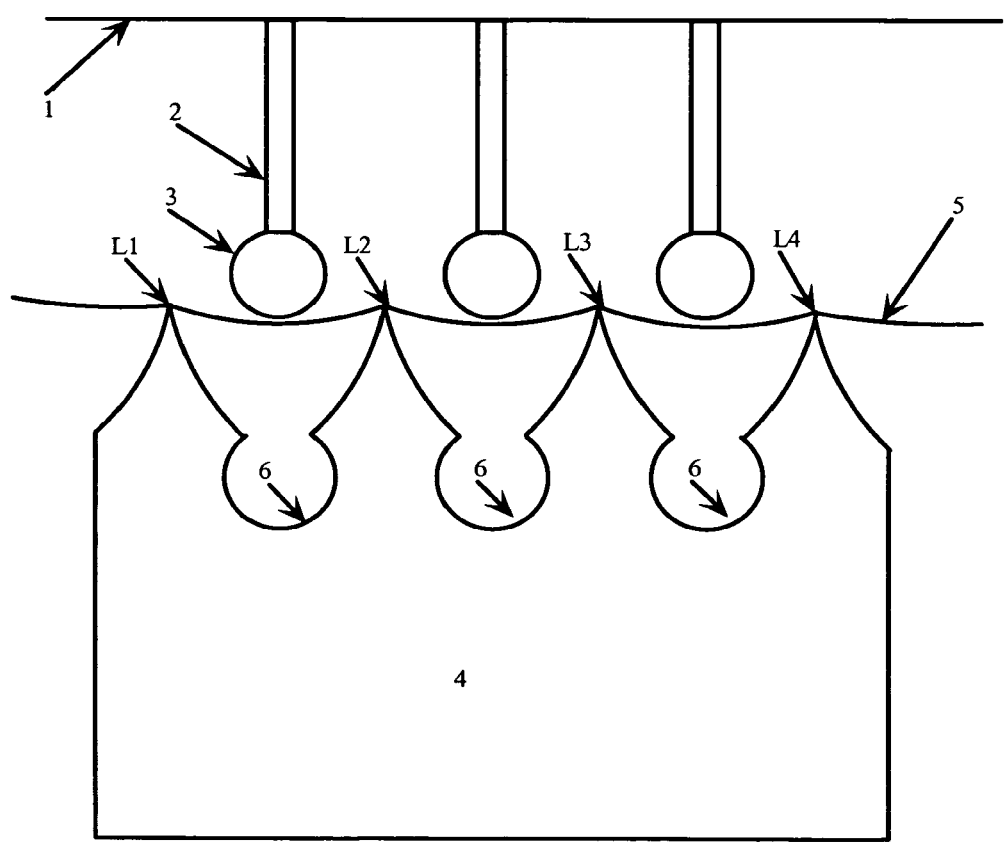
FIG. 14 is a cross sectional view of a stamping device in accordance with one embodiment of the present invention in a first phase.
Figure 15:
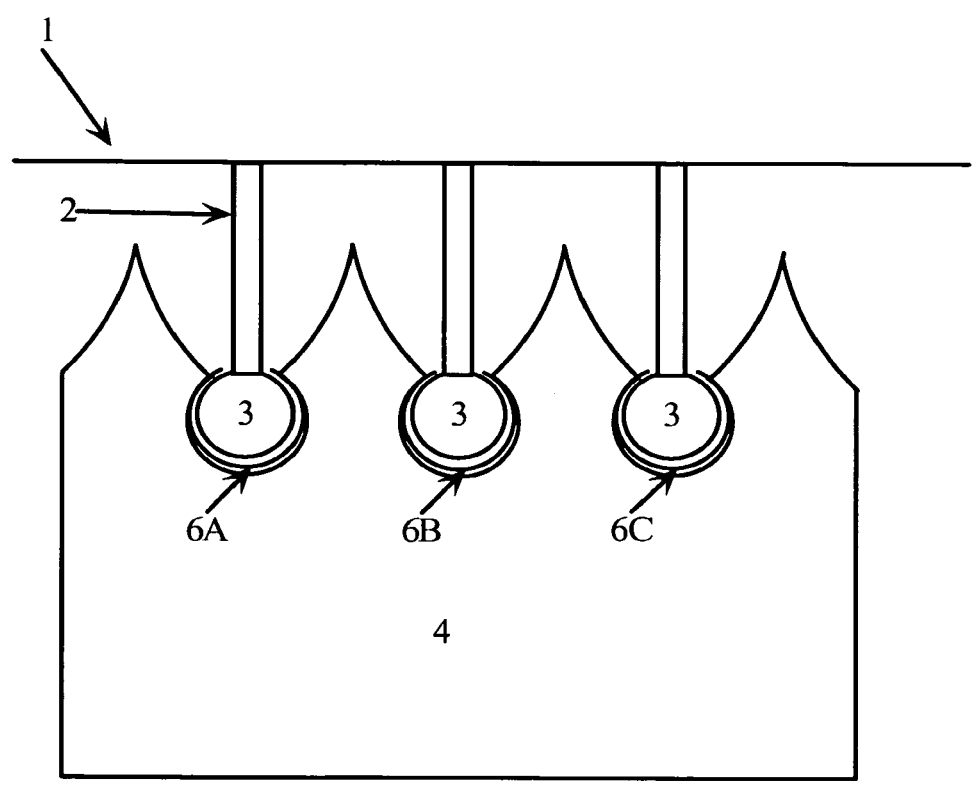
FIG. 15 is a cross sectional view of the device in FIG. 14 in a second phase.

Looking now at FIGS. 14 and 15, a positive stamp or upper section 1 and a negative stamp or lower section 4 may be provided so that they accommodate one another when they are brought into physical contact during the manufacturing process. The upper stamp section 1 may include at least one arm 2 extending from the upper section 1 and a tip 3, wherein the tip 3 may be constructed of a nanotube that may be straight into the page or it may have the two ends joined to form a torus in shape as in FIGS. 3 and 4. The lower stamp section 4 may include grooves 6 into which the tip 3 from the upper section may be complementarily accommodated. The lower section 4 may also include loading points L1, L2, L3 and L4 on which a graphene sheet material 5 may be placed.

As illustrated in FIG. 15, when the upper section 1 comes into contact with the lower section 4, the tip 3 may push the graphene sheet material 5, positioned on loading points L1, L2, L3 and L4, into the complementarily shaped groove 6.

As the graphene sheet material 5 is pushed into groove 6, the sheet material may be caused to shear or break its covalent bonds at the loading points L1, L2, L3 and L4, thus cutting the graphene sheet material 5. It should be noted that groove 6 may be provided with such a diameter so as to generate a nanotube structure with a similarly sized diameter. Once within the groove 6, the tip 3 may be moved, from the perspective of FIG. 15, substantially perpendicularly to the plane out of the paper toward the reader to allow the tip 3 to be withdrawn from the lower stamp section 4 if the tip is straight. In a torus form the tip 3 would roll from one end of the lower stamp section 4 to the other. As the tip 3 is withdrawn or rolled out, the graphene sheet material 5, cut into sections 6A, 6B and 6C at the bottom of the lower stamp section 4, is permitted to remain with the respective groove. Due to the proximity of the edges of the cut sheets 6A-C within the grooves, the dangling edge bonds on the edges of each of the cut sheets 6A-C are permitted to join, thus generating a nanotube. In one embodiment, the graphene sheet material 5 may be deformed prior to the stamping process. Alternatively, the sheet material 5 may remain non-deformed prior to the stamping process. This deformation of sheet material may also be applied to the processes described above. In the above process the application of electric and/or magnetic fields may be used to facilitate the removal of the completed tubes from the mold or imprinting process.

Although illustrated as a tube (i.e., circular in cross-section), it should be noted that the tip 3 and the complementary groove 6 may be provided with any cross-sectional geometric shape, so long as tip 3 may be complementarily accommodated within groove 6. Alternatively, tip 3 may be of a non-complementary shape with respect to groove 6, so long as tip 3 fits within groove 6. This is because the cut graphene sheet 5, once cut, may generally form a tubular shaped nanotube subsequent to the joining of the edges of the sheet 5.

In addition, the upper and lower stamp sections can be of various complex structures, for instance, branch three dimensional pattern structures, and may include etched or deposited layers of material, such as diamond or diamond-like or imprinted structures, or other suitable material or materials to carry out the mechanical stamping process for the purpose of nanotube formation, or other complex three dimensional structures. It should also be noted that the upper stamp section 1 may be a roller section and the lower stamp section 4 may be a non-roller section or that the sections 1 and 4 may be a continuous roller process or any combination thereof The stamping method, in accordance with one embodiment of the present invention, can allow for the manufacture of nanotubes, such as carbon nanotubes, in a highly controlled manner, such that the stamps used can determine the number of carbon atoms that make up the circumference of the nanotube structure. Specifically, the upper section 1 and lower section 4 can be provided with predetermined circumferential or diametrical dimensions to which a graphene sheet material may be cut and from which a nanotube may form with a specific diameter. The chirality of the nanotube may be controlled by means of alignment of the graphene sheet material or other sheet material used in the stamping method. Thus, there is provided a means of controlling both components of the chirial vector (n, m) of the nanotube structures formed wherein left-handed chirality and right-handed chirality nanotubes may be formed.

The physical dimensions of the upper and lower stamp sections 1 and 4 can also determine the length of the nanotube formed. Specifically, the length dimensions of the upper and lower stamp sections can be such as to cause the graphene sheet material 5 or other sheet material to be cut and formed into nanotube structures of a similar length.

The stamping process provided herein may be of a batch type or continuous process or method and may be determined by the application of the material to be used. For example, a continuous process may be used for manufacturing long nanotube structures, whereas a batch process may be used for applications wherein the length of the nanotube structures may be limited for a particular application such as electronics and displays. The stamping process of the present invention will also allow for manufacture of nanotubes in a cost effective manner. This will allow for the mass production of nanotubes for various applications.

In use, carbon nanotubes may be made of a single graphene sheet. The sheet may be roll formed in a continuous process into a hollow cylinder, which can be called a single-walled nanotube (SWNT) structure. The carbon nanotubes may also be made of several graphene sheets roll formed into concentrically arranged cylinders, which are called multi-walled nanotube (MWNT) structures. Additionally, there are a large number of variations of each type of these nanotubes which are identified by a two digit sequence (n, m) called the chiral vector. The first digit n indicates the number of atoms around the circumference of the nanotube and the second digit m designates the offset angle of the lattice structure around the nanotube. If the second digit is zero then the nanotube is called an armchair nanotube. If both digits are equal (n=m) then the nanotube is called a zigzag nanotube. Otherwise, they are called chiral nanotubes, which may be right-handed or left-handed in chirality.

The nanomechanical or mechanosynthesis process for the formation or manufacturing of MWNT is similar as for the manufacturing of SWNT, the difference being in the structure formed includes added layers of graphene sheets to produce concentrically arranged or formed cylinders or tubes. A broad range of feed sheet material may be used in such a nanomechanical or mechanosynthesis process, such as, but not limited to, proteins, organic molecules, inorganic molecules, graphene, polymers, metals, metal oxides, metal nitrides, ceramics or any atoms and any matrix or combination thereof. In addition and as discussed in more detail below, the feed sheet material can comprise a base material (e.g., graphene) and a dopant or atom not normally found present in the feed material. The dopant can be a replacement for one or more atoms of the base material's typical structure, or can be an additional component, such as an atom covalently or ionically bonded to the surface of the feed material.

Nanotubes produced in accordance with an embodiment of the present invention may be useful in a variety of applications, including reinforcement of materials such as glass, metal, matrix or composite materials. These reinforced materials may be used in manufacturing macroscopic objects such as tires, aircraft frames, spacecraft, ship hulls, structural buildings, cars, trucks, trains, trains tracks, roads, and bridges. Nanotubes produced in accordance with an embodiment of the present invention may also be used in filters in chemical, electrical, medical and mechanical systems applications.

The nanotube structures formed in accordance with an embodiment of the present invention need not be constituted of carbon. The materials from which the nanotubes are formed may be further controlled and varied by, for instance, a method in which individual atoms and/or molecules may be placed within the center or outer surface of a nanotube structure or within the nanotube lattice structure at any desired interval and/or position during the continuous formation process. Such a placement within a nanotube lattice structure may be implemented by using an associated camed roller or other suitable means such as electron and/or ion beams in which individual atoms and/or molecules are inserted or removed at bonding sites at the surface and/or and/or lattice structure and/or edge of the sheet material used. In the formation of the nanotube, prior to the edges of the sheet material being joined into a tube structure atoms and/or molecules may be placed at the edges and/or other positions on the inner or outer surface of the nanotube structure. Such formed nanotube lattice structures are controlled as to the constitute atoms and/or molecules. Such a structure may result in the formation of quantum state structures thus allowing for the possibility of forming multiple quantum well structures (MQWS). Such (MQWS) are due to changes of planar $sp^2$ bonding on the nanotube surface to local $sp^3$ like bonding with atoms such as hydrogen atoms thus affecting the conduction band structure for electrical and/or photonic properties all of which may be varied along the length of the nanotube structures formed. For instance, the bands may be interspersed, may be of any length, or interval on the nanotube structure, or may consist of partial bands thereby allowing for the formation or manufacture of novel quantum well super lattice structures that can allow for the realization of unique band gap engineering. Examples of such structures include ultra high frequency transistor structures, solid state lasers, optical detectors, low dielectric constant packaging, tailored thermal and electric conductivity, waveguide structures, ultra high energy density capacitors and polyceramic systems, polychromic and optics detectors, bio-mimetically synthesized materials, nanostructured metal matrix and systems, fluorescent coated filters for detection of biological agents, artificial muscles, solar cells, atomic layer controlled coatings, nanophotonics, battery and fuel cell technology, light emitting devices, advanced imaging technology, micro and nanoscale electromechanical systems, spintronic devices, single electron devices such as single electron transistors and sensors.

The method of motorized action within the nano mechanosynthesis process may be accomplished, for example, by application of mechanical torque to the geared teeth attached to the nanotube structures, such as the nanoshafts or rollers. Alternatively, laser electric fields causing rotation of the carbon nanotubes directly or a nanotube gear intermediary may be used. Such motor action may be accomplished through the interactions of forces between the free charges in the body of the nanotubes and the applied laser electric field.

One possible use may be to make electrically conductive cables out of the long nanotube structures formed. For such cables, there may be an electrical conductivity that is dramatically higher than that of copper, approximately 1000 times higher. Moreover, doped or inserted donor atoms into such long nanotube structures can create a superconducting cable, which is capable of being a high temperature superconductor.

Another possible use is to incorporate such long conductor cables within a macroscopic mechanical process wherein the conductor cable can generate electrical power. In particular, physical bending or deformation of said conductor cable may be implemented thus providing for a conversion of mechanical energy into electrical energy, such as is currently used with the application of piezofilm. These piezofilms, which may be employed as sensors, can also incorporate the use of nanotubes within a film to enhance the level of performance and reliability.

In another embodiment nanostructures may be used to alter, transmit, and direct applied forces in a manner such as to accomplish the mechanical feeding, rolling, cutting and forming of feed sheet material, such as graphene, in order to form nanotube structures from properly aligned feed stock sheet material. This alignment may be accomplished by, for instance, using surfactants to organize feed stock material into sheet forms resulting from electrostatic, hydrogen-bonding, covalent and Van der Waals interactions wherein applied electric and/or magnetic fields may be used to align and or feed the feed stock materials. This process will manufacture carbon nanotubes and other nanotube structures that will mechanically feed, roll, cut and form the aligned feed stock material sheets into nanotube structures, such that there is control as to the degree of twist or chiral angle in the nanotube structures formed.

Various nanostructures may be used in the construction of the nanomachinery system. For instance, carbon nanotubes and/or other fullerenes such as buckyballs, carbon nanospirals, nanocoils, carbon nanocones, nanointerfaces, and other such nanostructures may be used in the formation of nanotubes and/or other fullerenes which may also be used in the formation of nanoscale gears, motors, rollers, cutters, levers and casings, all of which may be assembled into nanomechanical machines for the purpose of nanoscale manufacturing of nanotube structures. The nanomachinery may be constructed of SWNT and/or MWNT wherein the gear teeth may be attached and may include atoms and/or molecules and/or other fullerene structures bonded onto the nanotube structures. The fabrication of the nanomachinery may also include nanojunctions so that the nanostructures may be physical joined for the construction of more complex nanodevices with such junctions.

Nanotubes such as carbon or boron nitride nanotubes or any other type of nanotube structure may be constructed in accordance with the systems and methods of the present invention that may incorporate the use of organic and/or non-organic molecules such as nylon, cellulose, protein, or hemicellulose type of materials. The present invention, in one embodiment, provides for a tunable approach to nanotube creation that allows application-specific varieties to be constructed from any combination or atoms and/or molecules such as proteins, organic molecules, inorganic molecules, graphene, polymers, metals, metal oxides, metal nitrides, carbon, nitrogen, hydrogen, oxygen, ceramics or any atoms and any combination thereof. Such new structures offer unique physical, chemical and electrical properties.

The nanotubes manufactured in accordance with an embodiment of the present invention provide hollow channels that can be custom-tailored to harbor specific molecules and/or atoms useful for a given application, for instance, high temperature super conducting wires for electricity, electronic computing and memory systems, solar cells, fuel cells, photonic nanotubes that process and/or generate light for a new generation of light sources and/or computer processing and/or memory systems and/or network architectures, and high-definition displays. The nanotubes made in accordance with an embodiment of the present invention may also be used in connection with biosensors and drug delivery systems, a new generation of medical applications, such as tendon or ligament repair, nerve repair, bone repair, ocular repair, auditory repair and integrated prosthetics, and numerous applications in fields ranging from disease treatment to industrial manufacturing such as plastics to optical information storage and computation.

The systems and methods of the present invention may also enhance the effectiveness of the current manufacturing methods in that the material output of the present invention allows for such nano, micro, milli, meso, and/or macroscopic manufacturing processes to incorporate the advantages and unique capabilities of nanotube structures by incorporating such nanotube structures into the various objects produced.

Moreover, it has been discovered that the carbon nanotubes of the present invention can be incorporated into macroscopic structures to increase the structural integrity and to provide sensing of the macroscopic structures. For instance, the presence of these nanotubes in bridges, buildings, ships, airplanes, rail or train tracks and roads, spacecraft structures and deployables, avionics and electronics, high rate planetary networks, space power and propulsion systems, and roads can indicate stress or wear in addition to providing increased structural integrity. The nanotubes of the present invention may also be applied to smaller macroscale objects such as cars, buses, trucks, bicycles, tires, or any part or component, or textiles, may be reinforced with the carbon nanotubes to enhance their structural integrity and provide for sensing capability.

It should be noted that in an embodiment of the present invention, the machinery may have mounted thereon a plurality of feed rollers, cutter rollers and former rollers constructed in such a manner that with the application of an input torque, the processes for forming of nanotube structures can be initiated and maintained.

A concern in nanotube design is the breaking of covalent bonds between the atoms. To accomplished this, a mechanical means may be provided whereby rollers can deform and pinch the feed sheet material, so as to cause the shearing or breaking of the covalent bonds of the feed sheet material. Thereafter, the cutter rollers may be used to cut the sheet into desired widths and partially formed into the shape of a tube as shown in FIG.1 at point 3.

Any combination of the above embodiments may be used in addition to that of manufacturing systems currently used to manufacture objects, thus increasing the effectiveness and aiding the usefulness of the current macroscopic manufacturing system or systems as well as increasing the associated performance level of said objects due to the advantageous characteristics of the nanotube structures manufactured in accordance with this patent which may also be employed in the above embodiments and embodiment combinations if needed.

Although exemplary embodiments of this invention have been described, it in no way limits the scope within this invention. Those skilled in the art will readily appreciate that any modifications are possible and are to be included within the scope of this invention as defined in the following claims. In the claims, where means plus function clause are used, they are intended to cover the structural concepts described herein as performing the recited function and not only structural equivalents but also equivalent structures.

The method of the invention as described herein above in the context of the preferred embodiments is not to be taken as limited to all of the provided details thereof, since modifications and variations thereof may be made without departing from the spirit and scope of the invention. For example, the principles of the invention in their broader aspects may be applied to other manufacturing systems for producing macroscopic objects that incorporate the use of the manufactured nanotube structures as described herein.

The invention claimed is:

1. A system, comprising:
a reservoir holding an aqueous volume of graphite feed stock material;
a rotating drum partially submerged within the aqueous volume of graphite feed stock material in the reservoir;
an ionizing radiation emitter adjacent to the drum and configured to emit ionizing radiation onto a portion of the graphite feed stock which is on the rotating drum as it rotates out of the aqueous volume in the reservoir, to remove non-carbon atoms from the graphite feed stock onto which the ionizing radiation is emitted by ionizing them into a gas.

2. The system of claim 1, wherein the ionizing radiation emitter is a laser.

3. The system of claim 1, wherein the graphite feed stock material comprises liquid trichlorobenzene or dichlorobenzene.

4. The system of claim 1, wherein the graphite feed stock is peptized by tannin, forming an aqueous solution or a dispersion in oil.

5. The system of claim 4, wherein the aqueous solution or dispersion in oil comprises deflocculated graphite.

6. The system of claim 1, further comprising a starter substrate placed on an outer surface of the drum.

7. The system of claim 6, wherein the starter substrate comprises biaxially-oriented polyethylene terephthalate.

8. A method, comprising:
holding an aqueous volume of graphite feed stock material in a reservoir;
rotating a drum partially submerged within the aqueous volume of graphite feed stock material in the reservoir;
as a portion of an outer surface of the drum rotates out of the aqueous volume of graphite feed stock material in the reservoir, emitting ionizing radiation onto a portion of the graphite feed stock which is deposited on the portion of the outer surface of the drum and ionizing non-carbon atoms in the portion of the graphite feed stock into a gas to remove them.

9. The method of claim 8, wherein emitting ionizing radiation comprises directing a laser beam.

10. The method of claim 8, further comprising initially peptizing the graphite feed stock by tannin to form an aqueous solution or a dispersion in oil.

11. The method of claim 10, wherein the aqueous solution or the dispersion in oil consists of deflocculated graphite.

12. The method of claim 8, further comprising placing a starter substrate on the outer surface of the drum.

13. The method of claim 12, wherein the starter substrate comprises biaxialy oriented polyethylene terephthalate.

14. The method of claim 8, wherein the graphite feed stock material comprises liquid trichlorobenzene or dichlorobenzene.

* * * * *